(12) United States Patent
Kondou et al.

(10) Patent No.: US 7,820,235 B2
(45) Date of Patent: Oct. 26, 2010

(54) PROCESS FOR PRODUCING COATED SHEET, OPTICALLY FUNCTIONAL LAYER, OPTICALLY COMPENSATING PLATE, OPTICAL DEVICE AND IMAGE DISPLAY

(75) Inventors: Seiji Kondou, Ibaraki (JP); Kazuki Tsuchimoto, Ibaraki (JP); Tomoaki Masuda, Ibaraki (JP); Makoto Komatsubara, Ibaraki (JP); Mie Oota, Ibaraki (JP); Ryuuichi Inoue, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1311 days.

(21) Appl. No.: 10/563,865

(22) PCT Filed: Mar. 19, 2004

(86) PCT No.: PCT/JP2004/003744

§ 371 (c)(1), (2), (4) Date: Jan. 9, 2006

(87) PCT Pub. No.: WO2005/005061

PCT Pub. Date: Jun. 20, 2005

(65) Prior Publication Data

US 2006/0158076 A1    Jul. 20, 2006

(30) Foreign Application Priority Data

Jul. 10, 2003    (JP) .............................. 2003-195002

(51) Int. Cl.
*B05D 5/06* (2006.01)
(52) U.S. Cl. ..................................... 427/162
(58) Field of Classification Search ................. 427/162, 427/372, 348
See application file for complete search history.

(56) References Cited

U.S. PATENT DOCUMENTS 5,744,057 A    4/1998    Meyer et al.

(Continued)

FOREIGN PATENT DOCUMENTS

CN    1387056 A    12/2002

(Continued)

OTHER PUBLICATIONS

Partial English machine translation of JP 2003-103211; JPO; 2009. pp. 1-6.*

(Continued)

*Primary Examiner*—Timothy H Meeks
*Assistant Examiner*—Elizabeth Burkhart
(74) *Attorney, Agent, or Firm*—Westerman, Hattori, Daniels & Adrian, LLP

(57) ABSTRACT

The method of cleaning a coated sheet according to the present invention is characterized in that dry wind is brown along the traveling direction of a film onto the surface of a coating layer wherein the solid content and the viscosity of the coating solution are within specified ranges. By this method, the thickness precision of the coating film can be improved in its large area, and the evenness of its in-plane optically functional property can be made even therein. The speed of the dry wind, the temperature of the wind, and the thickness of the dried coating film are preferably within specified ranges. In particular, the coated sheet is very useful as an optical material having good properties in an optically functional layer which is frequently used as a large-area coated sheet, an optical device having such an optically functional layer, an optically compensating layer, or an optically compensating plate. The coated sheet is particularly effective for an image display on which they are mounted.

14 Claims, 2 Drawing Sheets

U.S. PATENT DOCUMENTS

| | | | |
|---|---|---|---|
| 5,780,629 A | | 7/1998 | Etzbach et al. |
| 2002/0027628 A1* | | 3/2002 | Ishizuka et al. ............. 349/118 |
| 2002/0176167 A1 | | 11/2002 | Kashima |
| 2004/0005405 A1* | | 1/2004 | Tsuchimoto et al. ........ 427/162 |

FOREIGN PATENT DOCUMENTS

| | | |
|---|---|---|
| DE | 43 42 280 A1 | 6/1995 |
| DE | 195 20 660 A1 | 12/1996 |
| DE | 195 20 704 A1 | 12/1996 |
| JP | 62-140672 | 6/1987 |
| JP | 8-94836 | 4/1996 |
| JP | 10-263453 | 10/1998 |
| JP | 2001-314799 | 11/2001 |
| JP | 2001-343529 | 12/2001 |
| JP | 2002-331267 | 11/2002 |
| JP | 2003-103211 | 4/2003 |
| JP | 2003-126768 | 5/2003 |

OTHER PUBLICATIONS

Partial English machine translation of JP 2003-126768; JPO; 2009; pp. 1-22.*

Partial English machine translation of JP 2002-331267; JPO; 2009; pp. 1-8.*

Partial English machine translation of JP 2001-314799; JPO; 2009.; pp. 1-9.*

English translation of JP2003-103211, Apr. 8, 2003.*

Office Action issued Nov. 9, 2007 in Corresponding Chinese Patent Application No. 200480014398.9, Partial.

International Preliminary Report on Patentability of Corresponding International Application No. PCT/JP2004/003744 mailed May 26, 2006.

* cited by examiner

A step(1)

B step(2)

C

PROCESS FOR PRODUCING COATED SHEET, OPTICALLY FUNCTIONAL LAYER, OPTICALLY COMPENSATING PLATE, OPTICAL DEVICE AND IMAGE DISPLAY

TECHNICAL FIELD

The present invention relates to a process for producing a coated sheet, and is in particular useful for forming an optically functional layer. Furthermore, an optical device or the like wherein the optically functional layer is used can be preferably used in various image displays such as a liquid crystal display (LCD), an organic EL display, a PDP and a CRT.

BACKGROUND ART

In general, examples of a coated sheet include various optical functional films having an optically functional layer. Formerly, the main currents of displays of OA instruments, such as TVs and desktop personal computers, were CRTs. However, the main currents have been changed to liquid crystal displays, which have great advantages such as thinness and lightness, and low power consumption. Liquid crystal displays spreading at present have optically functional layers such as a liquid crystal layer for forming a phase difference film, a hard coat layer for surface-protection, and an antireflective layer.

In order to yield such an optically functional layer, methods of applying an optically functional layer onto a substrate film have been variously used hitherto. Various coated sheets wherein a coating layer is formed by conducting the application of a coating solution onto a substrate film, drying it, and subjecting to some other steps are produced (see, for example, Japanese Patent Application Laid-Open No. 62-140672). General examples of the coating method for a thin layer include a slot die coater and a gravure coater.

In recent years, with enhancement in the performance of optical functions, it has been becoming essential to improve the evenness of a coating film which gives the function. Thus, it has been becoming important to not only select the coating method but also control the drying step after coating (see, for example, Japanese Patent Application Laid-Open No. 8-94836).

However, even if any coating method is used, resin-flow is caused during the shift from the coating step to the drying step. Thus, it is difficult to form a coating layer having an even film thickness. It is particularly difficult to form a coating layer having an even film thickness onto a substrate film having a large area.

For example, in the case that a hard coat layer, an antireflective layer and so on are formed on a polymer film, laminated layers have different refractive indexes. Consequently, a particularly serious problem is interference unevenness, which results from thickness unevenness generated by the flow of the resins after the application of the coating solutions. In this case, the in-plane optical thickness becomes uneven so that the reflectivity characteristic becomes lower than the theoretical value.

It is known that in general liquid crystal molecules which constitute a liquid crystal layer are very easily affected by the interface thereof so that the liquid crystal molecules are arranged (oriented) to have aromaticity by surface-regulating force such as rubbing. In the case of the above-mentioned coating methods, a single surface of the applied coating solution containing liquid crystal molecules becomes an open system; consequently, according to ordinarily-known coating and drying methods, the flow of the air on the open system side causes orientation unevenness of the liquid crystal layer. The thus-obtained liquid crystal layer causes a problem that the front face contrast of the liquid crystal display changes partially.

DISCLOSURE OF THE INVENTION

An object of the present invention is to improve a thickness precision of a coating film in a large area of a coated sheet, thereby making its in-plane optically functional property even; and further to provide a satisfactory optically functional layer, optically compensating plate, optical device or image display, utilizing it.

In order to attain the object, the inventors have made eager researches to find out that the object can be attained by the following processes for producing a coated sheet; thus, the present invention has been made.

The present invention is characterized in that, in a process for producing a coated sheet, comprising the step of applying a coating solution containing a resin material and a solvent onto a substrate film to form a coating layer and the step of drying the applied coating solution, dry wind is blown along the traveling direction of the film onto the surface of the coating layer wherein the coating solution has a solid content of 55% by weight or less and a viscosity of 20 mPa·s or less. The present invention is also characterized by comprising the step of applying a coating solution containing a resin material and a solvent onto a substrate film to form a coating layer having a solid content of 55% by weight or less and a viscosity of 20 mPa·s or less, the step of blowing dry wind along the traveling direction of the substrate film onto the coating layer, and the step of drying the coating layer. By the blowing of the dry wind, minute irregularities are formed in the surface of the coating film. As the irregularities are more minute, the following effects are more expressed, that is, a leveling effect in a subsequent solvent-vaporizing step; and an effect that when the dry wind is blown thereto, the solvent evaporates instantaneously so that the viscosity rises before convection of the coating solution is generated by evaporation unevenness of the solvent, whereby the flow of the solution is not caused, are expressed, which have been found by the inventors. Thus, the thickness precision of the coating layer can be improved in its large area and its in-plane optically functional property can be made even therein.

It is preferred that a wind speed of the blown dry wind is from 4 to 20 m/sec., and a scattering in the wind speed in the width direction of the film is ±30% or less. According to such conditions, it is possible to attain more effectively an improvement in the thickness precision of the coating layer and the evenness of its in-plane optically functional property.

It is also preferred that a temperature of the blown dry wind is from 20 to 45° C., and a scattering in the temperature in the width direction of the film is +15% or less. According to such conditions, it is possible to keep a more appropriate solvent-vaporizing speed and further attain even more effectively the improvement in the thickness precision of the coating layer and the evenness of the in-plane optically functional property.

In the invention, it is preferred that the thickness of the dried coating layer is 30 µm or less. According to the restriction of the thickness of the coating layer besides the above-mentioned conditions for blowing the dry wind, it is possible to attain even more effectively the improvement in the thickness precision of the coating layer and the evenness of the in-plane optically functional property.

In the invention, it is preferred that a material which makes an optical function is used in the coating solution, thereby forming the coating layer as an optically functional layer. A coated sheet producing process as described above is particularly effective for an optically functional layer required to have precision in coating film thickness (thickness of the coating layer) and evenness of its in-plane optically functional property even if the area thereof is large.

In the coated sheet producing process of the invention, it is preferred that a material which makes an optically compensating function is used as the material which makes the optical function, thereby forming the coating layer as an optically compensating layer. As to an optically compensating layer required to have precision in coating film thickness and evenness of its in-plane optically functional property, the production process as described above is a particularly effective method for producing the layer.

In the coated sheet producing process of the invention, it is preferred to form, as the optically compensating layer, a cholesteric layer wherein constituent molecules are oriented in the state of a cholesteric structure. This production process is particularly effective for an optically compensating layer which has a cholesteric structure and is required to have precision in coating film thickness and evenness of its in-plane optically functional property.

It is preferred that a liquid crystal monomer is used as the material which makes the optically compensating function and after the drying step the coating layer is subjected to polymerizing treatment or crosslinking treatment, thereby forming a cholesteric layer having constituent elements of a non-liquid-crystal polymer wherein the liquid crystal monomers are polymerized or crosslinked. In this optically compensating plate, the polymer obtained by the polymerization or crosslinking is a non-liquid-crystal; therefore, in the formed cholesteric layer, there is not caused a change between liquid crystal phase, glass phase and crystal phase by temperature-change, the phase-change being peculiar to liquid crystal molecules, and the cholesteric structure is not affected by temperature-change. That is, the present optically compensating plate is an optically compensating plate which is very good in stability and good in evenness of its in-plane optically functional property.

Alternatively, it is preferred that a liquid crystal monomer or a liquid crystal polymer is used as the material which makes the optically compensating function, thereby forming a cholesteric layer having constituent elements of an oriented liquid crystal polymer having a cholesteric structure. Even if the constituent elements constitute the liquid crystal polymer, the incorporation of a cholesteric liquid crystal monomer or a chiral agent into the polymer makes it possible to form a cholesteric layer less affected by temperature-change in the same manner as described above, and further produce an optically compensating plate very good in stability and good in evenness of its in-plane optically functional property.

It is preferred that a thickness of the cholesteric layer ranges from 0.5 to 10 µm. According to this range of the film thickness, it is possible to prevent a disturbance of orientation in the optically compensating layer, a fall in the transmittance thereof and coloring thereof, and improve the selective reflectivity and productivity thereof.

The invention is preferably an optically compensating plate obtained in the case that the above-mentioned optically functional layer is an optically compensating layer or in the case that constituent elements of this optically compensating layer constitute an oriented cholesteric layer having a cholesteric structure. The optically functional layer obtained by the above-mentioned coated sheet producing process is high in precision in coating film thickness and good in evenness of its in-plane function and property. The invention is particularly effective for an optically compensating plate wherein this optically functional layer is used as an optically compensating layer or an optically compensating layer having a cholesteric structure.

The present invention is also preferred for an optical device having such an optically functional layer. Optical devices are required to have various properties in accordance with the usage thereof; the above-mentioned optical device ensures precision in coating film thickness and in-plane evenness, which are highly important among these properties.

The optical device of the invention is characterized in that at least one polarizing plate is laminated on the above-mentioned optically compensating plate. By the formation of the optical device, wherein at least one polarizing plate is laminated on an optically compensating plate very good in stability as described above, the optical device can have good optically functional property.

Furthermore, the invention is preferred for an image display wherein the above-mentioned optically functional layer, optically compensating plate or optical device is mounted. According to this optically functional layer, optically compensating plate or optical device, an image display without any image unevenness or strain can be produced.

BEST MODES FOR CARRYING OUT THE INVENTION

Figure 1:
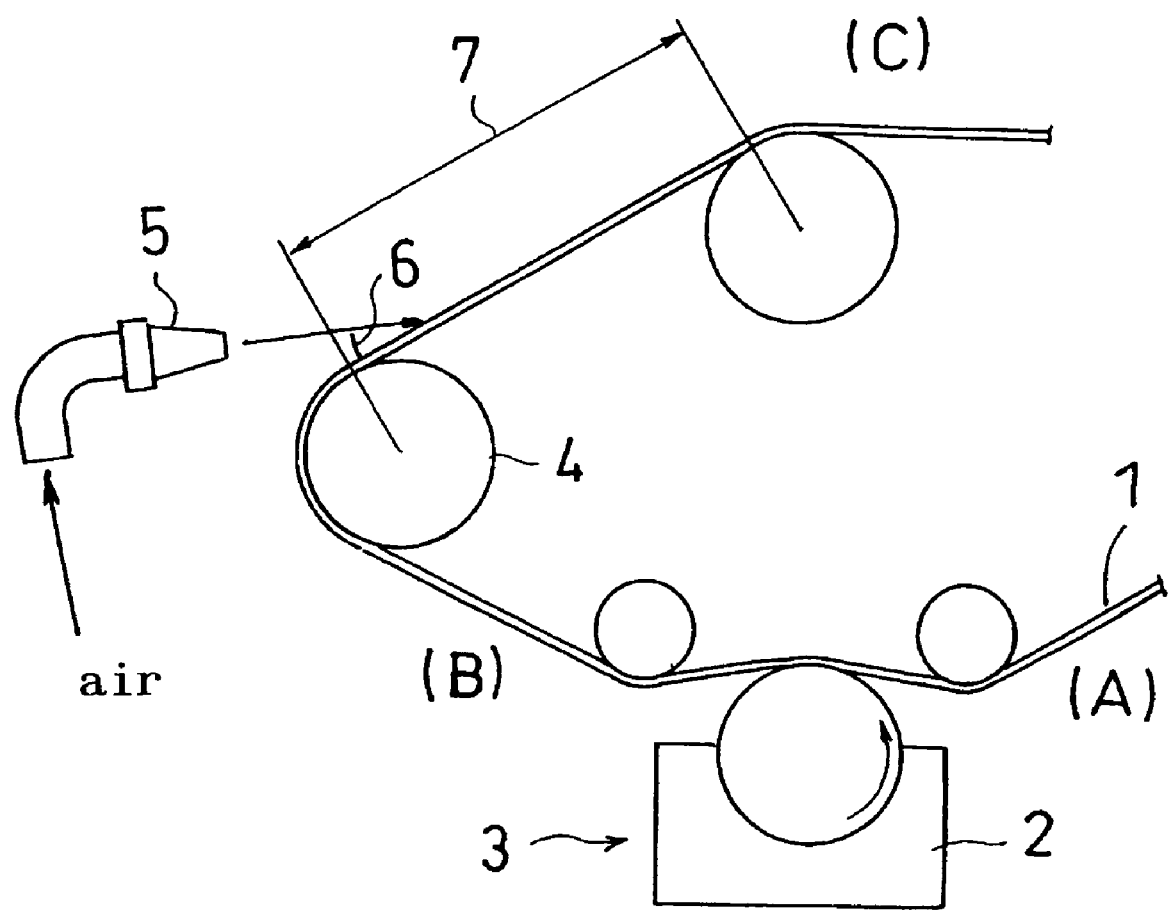
FIG. 1 is an explanatory view illustrating an embodiment of the present invention.
Figure 2:
FIG. 2 is an explanatory view illustrating states of a coated sheet as an embodiment of the present invention.
Figure 2:
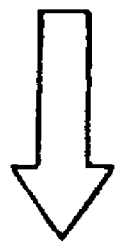
Figure 2:
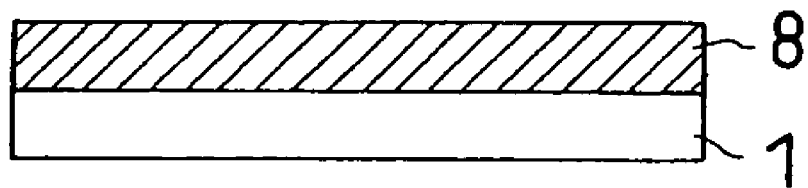
Figure 2:
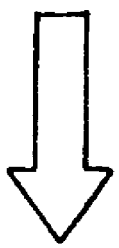
Figure 2:
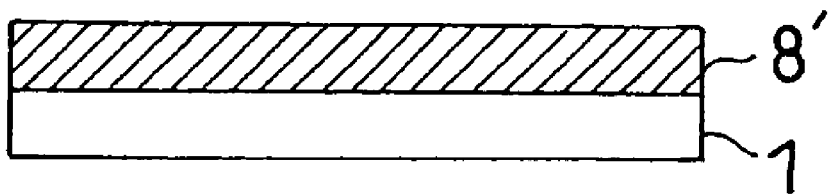

With reference to the drawings, embodiments of the present invention will be described hereinafter. FIG. 1 is a schematic view of a production apparatus illustrating an example of the invention, and FIG. 2 is an explanatory view illustrating the state of a coated sheet in each step in the apparatus.

In FIG. 1 is illustrated an example of a production process for forming a coated sheet wherein a substrate film 1, which may be referred to merely as the "film" 1 hereinafter, is transported with a roller 4 so as to be successively passed through in order the step (1) of applying a coating solution 2 containing a resin material and a solvent onto the film 1 and the step (2) of drying the applied coating solution. The film 1 fed out with the transporting roller 4 is coated with the coating solution 2 by use of a gravure roll coater 3 in the step (1), and then shifted to the step (2). In the step (2), dry wind is blown from a nozzle 5 onto the surface of the coating layer on the film 1 at a given blowing angle 6 in the range of an air-blowing section 7. In the step (2), the coating film may be dried. After the step (2), the step of drying the coating layer may be performed. In other words, the present invention is an invented process of contriving various conditions for the drying step, thereby forming an optimal coating layer.

The method for applying the coating solution 2 in the step (1) is not particularly limited, and may be carried out in an ordinary method. Examples thereof include slot die coating, reverse gravure coating, micro gravure coating, dipping coating, spin coating, brush coating, roll coating, and flexography. In FIG. 1, an example of methods using a gravure roll coater 3 is illustrated.

The method for producing the dry wind in the step (2) is not particularly limited, and an ordinary heating means can be adopted. Examples thereof include a hot wind generator, a heating roll, and a far-infrared ray heater.

After the step (2), a curing treatment such as heat curing or UV curing, may be conducted in accordance with the kind of the coating solution. Thereafter, the resultant coated sheet is subjected to post-treatment in accordance with the specification of the coated sheet, such as a case where the sheet is wound onto a winding roll (not shown) or a case where the sheet is coated with a protecting sheet and the resultant is wound. The thus-obtained coating layer, which may be sometimes referred to as painted layer hereinafter, can be used without being peeled from the film 1, or can be used after this layer is peeled from the film 1.

FIG. 2 illustrates cross sections of the film 1 that are successively formed in respective steps, and illustrates a state (A) thereof before the coating, a state (B) thereof immediately after the coating solution 2 is applied onto the film 1 to form a coating layer 8, and a state (C) of a coating layer 8' after the drying treatment.

The present invention is characterized in that in the production process, the dry wind is blown along the traveling direction of the film 1 onto the surface of the coating layer 8 wherein the solid content in the coating solution is 55% by weight or less and the viscosity of the coating solution is 20 mPa·s or less. It appears to the inventors that the coating layer 8 and the in-plane optically functional property thereof are made homogeneous or even for the following reason: when the wind is blown thereto, minute irregularities which are not easily sensed with the naked eye are formed in the surface of the coating layer so that visually large irregularities come not to be easily viewed; and leveling effect generated in a subsequent solvent-evaporating step is more expressed as the irregularities are more minute. It also appears that there is produced an effect that when the dry wind is applied thereto, the solvent evaporates instantaneously so that the viscosity rises before convection of the coating solution is generated by evaporation unevenness of the solvent, whereby the flow of the solution comes not to be caused. If the solid content of the coating layer onto which the wind is blown is more than 55% by weight, the leveling effect, which is generated at the same time when the solvent evaporates, is not sufficiently obtained. If the viscosity is more than 20 mPa·s, minute irregularities are not easily formed in the surface of the coating layer. The above-mentioned requirements are important particularly in order to improve the thickness precision of the coating layer and make the in-plane optically functional layer thereof even in its large area. For the measurement of the viscosity, it is advisable to use an ordinary device, such as a rotational type or falling-ball type device. In the invention, the viscosity is based on values measured with a rheometer: RS-1 (manufactured by Heake Co.)

It is preferred that the speed of the blown dry wind is from 4 to 20 m/sec., and a scattering in the wind speed in the width direction of the film is ±30% or less. About the blowing dry wind, minute irregularities are not formed in the surface of the coating film if the wind speed is less than 4 m/sec. Conversely, if the wind speed is more than 20 m/sec., the irregularities in the coating surface become uneven and too large. Thus, as the case may be, the coating solution may be scattered. The wind speed referred to herein is a speed of the wind near the surface of the coating layer, and is wind speed measured within 30 mm of the surface of the coating layer. It is advisable to use an ordinary device, such as a propeller type or hot-wire type device, in order to measure the wind speed. In the invention, the wind speed is based on the value measured with a Climomaster: Model 16531 (manufactured by KANOMAX Inc.). In connection with this, the direction of the blown dry wind also produces an effect on the value. If the blowing angle to the substrate film 1 is more than 30°, the irregularities in the coating film become too large.

Furthermore, it is preferred that the temperature of the blown wind is from 20 to 45° C. and a scattering in the temperature in the width direction of the film is ±15% or less. If the temperature of the wind is 50° C. or higher, the solvent-evaporating speed is too high to give leveling effect.

In the invention, it is preferred that the thickness of the dried coating layer is 30 µm or less. If the dry thickness is more than 30 µm, the concentration distribution of the coating solution or convection is generated in the thickness direction of the painted layer so that the homogeneity of the painted layer is easily lost. In the production process of the invention, the dry thickness of the painted layer is preferably from 0.05 to 50 µm, in particular preferably from 0.1 to 10 µm. Actually, the dry thickness is not easily measured in many cases. In reality, there may be adopted a method of ensuring conditions as described above on the basis of wet thickness containing the solvent, which is calculated from the solid content in the coating solution. According to this method, the same effect can be obtained.

In the invention, it is preferred that the coating layer 8' is an optically functional layer. A coated sheet producing process as described above is particularly effective for an optically functional layer required to have precision in coating film thickness and in-plane evenness of its optically functional property in its large area.

The coated sheet producing process of the invention is preferred in the case that the optically functional layer is an optically compensating layer. A production process as described above is a particularly effective production process for an optically compensating layer required to have precision in coating film thickness and in-plane evenness of its optically functional property. Details of the optically compensating layer will be described later.

The coated sheet producing process of the invention is preferred in the case that constituent molecules of the above-mentioned optically compensating layer constitute an oriented cholesteric layer having a cholesteric structure. The above-mentioned production process is particularly effective for an optically compensating layer which has a cholesteric structure and is required to have precision in coating film thickness and in-plane evenness of its optically functional property. Details of the cholesteric layer will be described later.

The invention is preferably an optically compensating plate obtained in the case that the above-mentioned optically functional layer is an optically compensating layer or in the case that constituent molecules of this optically compensating layer constitute an oriented cholesteric layer having a cholesteric structure. The optically functional layer obtained by the above-mentioned coated sheet producing process is high in precision in coating film thickness, and is good in evenness of its in-plane optically functional property. The invention is particularly effective for an optically compensating plate wherein the optically functional layer is rendered an optically compensating layer or an optically compensating layer having a cholesteric structure.

The thickness of the cholesteric layer preferably ranges from 0.5 to 10 µm. Any thickness within this range makes it possible to prevent a disturbance of orientation in the optically compensating layer, a fall in the transmittance thereof and coloring thereof, and improve the selective reflectivity and productivity thereof. Details thereof will be described later.

It is preferred that constituent elements of the cholesteric layer constitute a non-liquid-crystal polymer and the non-liquid-crystal is a polymer wherein an oriented liquid crystal monomers having a cholesteric structure are polymerized or crosslinked. In such an optically compensating plate, the polymer obtained by the polymerization or crosslinking is a non-liquid-crystal; therefore, in the formed cholesteric layer, there is not caused a change between liquid crystal phase, glass phase and crystal phase by temperature-change, the phase-change being peculiar to liquid crystal molecules, and the cholesteric structure is not affected by temperature-change. Thus, the present optically compensating plate is an optically compensating plate which is very good in stability and good in evenness of its in-plane optically functional property. Details thereof will be described later.

Alternatively, it is preferred that the constituent elements of the cholesteric layer constitute a liquid crystal polymer and the liquid crystal polymer is oriented in the state of a cholesteric structure. Even if the constituent elements constitute the liquid crystal polymer, the incorporation of a cholesteric liquid crystal monomer or a chiral agent into the polymer makes it possible to form a cholesteric layer less affected by temperature-change in the same manner as described above, and further produce an optically compensating plate very good in stability and good in evenness of its in-plane optically functional property. Details thereof will be described later.

The invention is an optical device characterized in that at least one polarizing plate is laminated on any one of the above-mentioned optically compensating plates. By the formation of the optical device, wherein at least one polarizing plate is laminated on an optically compensating plate very good in stability as described above, the optical device can have good optically functional property. Details of the optical device will be described later.

The film 1, the coating solution and so on that are used in the coated sheet producing process of the invention are appropriately decided in accordance with the kind of the coated layer to be formed, and the usage thereof. Details thereof will be described hereinafter.

The film 1 may have any layer made of a material having a measure of wettability to the coating solution. Examples thereof include a transparent substrate film, an oriented substrate, various glass plates, and a photoresist.

When an optical functional layer is formed by a coating solution, it is preferred that film 1 is a transparent substrate film. As examples of the transparent polymer forming of the above-mentioned transparent substrate film, for example, polyester type polymers, such as polyethylene terephthalate and polyethylenenaphthalate; cellulose type polymers, such as diacetyl cellulose and triacetyl cellulose; polycarbonate type polymer; acrylics type polymer, such as poly methylmethacrylate may be mentioned. And as the polymer forming transparent substrate, styrene type polymers, such as polystyrene and acrylonitrile-styrene copolymer; olefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Especially in optical property, a film having small birefringence is suitably used.

For the transparent substrate film, preferred is a cellulose polymer such as triacetylcellulose from the viewpoint of the light polarizing property or endurance thereof. A triacetylcellulose film is particularly preferred.

Moreover, as is described in Japanese Patent Laid-Open Publication No. 2001-343529 (WO 01/37007), polymer films, for example, resin compositions including (A) thermoplastic resins having substituted and/or non-substituted imide group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

It is preferred that the degree of the coloration of the transparent substrate film is as little as possible. Accordingly, it is preferred to use a protective film wherein a phase difference value in the film thickness direction, which is represented by $Rth=[(nx+ny)/2-nz] \cdot d$ wherein nx and ny represent main refractive indexes of the film in its plane, nz represents a refractive index of the film in the thickness direction thereof, and d represents a thickness of the film, is from −90 to +75 nm. The use of the film wherein the phase difference value (Rth) in the thickness direction is from −90 nm to +75 nm makes it possible to overcome substantially the coloration (optical coloration) of the polarizing plate, resulting from the protective film. The phase difference value (Rth) in the thickness direction is more preferably from −80 nm to +60 nm, more preferably from −70 nm to +45 nm.

A thickness of a transparent substrate is determined appropriately, and in general, it is approximately 10 to 500 μm so that it may have suitable thinness, or in viewpoint of workability, such as strength and handling property. Especially it is preferably 20 to 300 μm, and more preferably 30 to 200 μm.

If a coating liquid used for this invention is able to form a coated film, any kinds of liquid may be applicable, and resin materials and solvents for a coating liquid may be selected corresponding to performances of a target coated layer. As coated layers formed using a method for coating of this invention, there may be mentioned optical functional layers, antistatic layers, surface protective layers, electric conductive functional layers, pressure sensitive adhesive layers, bonding adhesive layers, transparent coated layers, etc. may be mentioned. In addition, formation of a coat with a coating liquid may be performed using a method to sequentially form layers onto a substrate. Therefore, a substrate with coated films beforehand formed thereon may be used. When an optical functional layer is formed as a coated layer in this invention, it is particularly preferable that an optical functional layer with a thickness of 30 μm or less is formed. As the optical functional layers concerned, hard coat layers, antireflective layers, retardation layers, optical compensation layers, etc. may be mentioned.

As transparent resins for forming a hard coat layer, if it is a resin having outstanding hard coat property (pencil hardness test of JIS K5400 shows a hardness of "H" or more), has a sufficient strength and has an outstanding light transmittance, any kinds may be applicable without any limitations. For example, thermosetting type resins, thermoplastic type resins, ultraviolet curable type resins, electron beam curable resins, two-component mixing type resins, etc. may be mentioned as examples of the above-mentioned resins. Among them, ultraviolet curable type resins are preferable that may efficiently form an optical diffusion layer using a simple processing operation, such as curing treatment with ultraviolet rays irradiation etc. The resins of ultraviolet curable type include various kinds of resins, such as polyester based, acrylics based, urethane based, amide based, silicone based, and epoxy based, and further monomers, oligomers, polymers of ultraviolet curing type, etc. As ultraviolet curable type resins preferably used, resins having functional groups with ultraviolet rays polymerizable property, for example, may be mentioned. Especially, resins including acrylics based monomer and oligomer components having two or more, especially three through six functional groups concerned may be mentioned. In addition, an ultraviolet rays polymerization initiator is blended in the ultraviolet curable type resins.

A hard coat layer may include conductive fine-grains. As conductive fine-grains, for example, metal fine-grains, such as aluminum, titanium, tin, gold, and silver, and ultra fine grains, such as ITO (indium oxide/tin oxide) and ATO (antimony oxide/tin oxide) may be mentioned. It is preferable that a mean diameter of grains of the conductive ultra fine grains is usually approximately 0.1 µm or less. Ultra fine grains of metals or metal oxides having a high refractive index may be added into a hard coat layer to adjust a high refractive index. As ultra fine grains having a high refractive index, ultra fine grains of metal oxides, such as $TiO_2$, $SnO_2$, $ZnO_2$, $ZrO_2$, aluminium oxide, and zinc oxide, may be mentioned. It is preferable that a mean diameter of grains of the ultra fine grains is usually approximately 0.1 µm or less.

Moreover, antiglare property may be given to a hard coat layer by dispersing inorganic or organic fillers having a globular form or an infinite form to give fine irregular structures to a front face, and thus antiglare property may be given to the hard coat layer. Antiglare property caused by optical diffusion may be realized by providing irregular surface form to a front face of the hard coat layer. Optical diffusion property is preferable also for reducing reflectance.

As inorganic or organic fillers having a globular form or an infinite form, for example, there may be mentioned: organic cross-linked or non cross-linked fine-grains comprising various polymers, such as PMMAs (poly methylmethacrylates), polyurethanes, polystyrenes, and melamine resins; inorganic grains, such as glass, silicas, aluminas, calcium oxides, titanias, zirconium dioxide, and zinc oxide; and conductive inorganic particles, such as tin oxides, indium oxide, cadmium oxides, antimony oxides, or compounds thereof. A mean diameter of grains of the above-mentioned fillers is 0.5 through 10 µm, and preferably 1 through 4 µm. When fine irregular structures are formed by fine-grains, an amount of fine-grains used is preferably approximately 1 through 30 parts by weight to resins 100 parts by weight.

Moreover, additives, such as leveling agents, thixotropy agents, and antistatic agents may be included in formation of a hard coat layer (antiglare layer). In formation of a hard coat layer 2 (antiglare layer), thixotropic agents (silica, mica, etc. having a diameter of grains of 0.1 µm or less) are blended, and thereby protruding fine grains easily form a irregular fine structures on a surface of the antiglare layer.

As materials for forming antireflective layers, for example, resin based materials, such as ultraviolet curing type acrylic resins; hybrid materials having inorganic fine grains dispersed in resins, such as colloidal silica; and sol-gel materials using metal alkoxides, such as tetra ethoxy silane and titanium tetra ethoxide, etc. may be mentioned. Compounds including fluoride groups are used for each material in order to give soil resistance to a surface. Low refractive index layer material including a large amount of mineral elements has a tendency to show excellent scratch-proof property, and among them particularly sol-gel based materials are preferable. Sol-gel based materials may be used after partial condensation reaction.

Perfluoroalkyl alkoxy silanes may be illustrated as the above-mentioned sol-gel based materials including fluoride groups. As perfluoroalkyl alkoxy silanes, for example, compounds represented by a general formula (1): $CF_3(CF_2)_nCH_2CH_2Si(OR)_3$ (where R represents alkyl group with 1 through 5 carbon numbers, and n represents an integer of 0 through 12) may be mentioned. Specifically, there may be mentioned; trifluoro propyl trimethoxy silane, trifluoro propyl triethoxy silane, tridecafluoro octyl trimethoxy silane, tridecafluoro octyl triethoxy silane, heptadecafluoro decyl trimethoxy silane, heptadecafluoro decyl triethoxy silane, etc. Especially, compounds whose n gives 2 through 6 are preferable.

Sols in which silica, alumina, titania, zirconia, magnesium fluorides, ceria, etc. are dispersed in an alcoholic solvent may be added into an antireflective layer. In addition, additives, such as metal salts and metal compounds, may suitably be blended.

In formation of a retardation layer and an optical compensation layer, for example, polymerizable crystalline liquid monomers and/or liquid crystal polymers may be used. As the above-mentioned polymerizable crystalline liquid monomers, for example, nematic liquid crystalline monomer may be mentioned. When polymerizable crystalline liquid monomers are included, photo polymerization initiators are usually included. As photo polymerization initiators, various kinds may be used without particular limitation.

As nematic liquid crystalline monomers, monomers that has polymerizable functional groups, such as acryloyl group and methacryloyl group at end groups, and has mesogen groups including cyclic units etc. in this may be mentioned. Moreover, cross-linking structures may be introduced using monomers having two or more of acryloyl groups, methacryloyl groups, etc., as polymerizable functional groups, to improve durability. As the above-mentioned cyclic units serve as mesogen groups, for example, there may be mentioned: biphenyl based, phenyl benzoate based, phenyl cyclohexane based, azoxy benzene based, azo methine based, azobenzene based, phenyl pyrimidine based, diphenyl acetylene based, diphenyl benzoate based, bicyclo hexane based, cyclo hexyl benzene based, terphenyl based units, etc. In addition, these cyclic units may have substituents, such as, cyano groups, alkyl groups, alkoxy groups, and halogen groups, as end groups.

As principal chain type liquid crystal polymers, condensation polymers having a structure where mesogen groups comprising aromatic series units etc. are combined, for example, polyester based and polyamide based, polycarbonate based and polyester imide based polymers may be mentioned. As the above-mentioned aromatic series unit serves as mesogen groups, units of phenyl based, biphenyl based, and naphthalene based may be mentioned, and these aromatic series units may have substituents, such as cyano groups, alkyl groups, alkoxy groups, and halogen groups.

As side-chain type liquid crystal polymers, polymers having acrylic resin based, poly methacrylate based, polysiloxane based, and poly malonate based principal chain as a skeleton, and having mesogen groups with side-chain comprising cyclic units etc. may be mentioned. As the above-mentioned cyclic unit providing mesogen groups, for example, there may be mentioned: biphenyl based, phenyl benzoate based, phenyl cyclohexane based, azoxy benzene based, azo methine based, azobenzene based, phenyl pyrimidine based, diphenyl acetylene based, diphenyl benzoate based, bicyclo hexane based, cyclo hexyl benzene based, terphenyl based units etc. In addition, end groups of these cyclic units may have substituents, such as cyano groups, alkyl groups, alkoxy groups, and halogen groups.

Any mesogen groups of the above-mentioned polymerizable crystalline liquid monomer and liquid crystal polymer may be bonded via spacer parts giving flexibility. Polymethylene chains, polyoxymethylene chains, etc. may be mentioned as spacer parts. A number of repetitions of structural units forming the spacer parts is suitably determined by chemical structures of mesogenic parts, and a number of repetition units of polymethylene chain is 0 through 20, and preferably 2 through 12, and a number of repetition units of polyoxymethylene chain is 0 through 10, and preferably is 1 through 3.

Cholesteric liquid crystalline monomers and chiral agents may be blended into the above-mentioned nematic liquid crystalline monomers and liquid crystal polymers so that cholesteric phase may be presented in liquid crystal state. In addition, cholesteric liquid crystal polymers may be used. Obtained cholesteric liquid crystal phase is used as a selective reflection film. Particularly as chiral agents, if it is chiral agent having optical activity groups and not disturbing orientation of nematic liquid crystalline monomers etc., any agents may be used without particular limitation. Chiral agents may have liquid crystalline property or may not have liquid crystalline property, and agents showing cholesteric liquid crystalline property may preferably be used. Although any chiral agents having or not having reactive groups may be used, agents having reactive groups are preferable in view of heat resistance and solvent resistance of cholesteric liquid crystal oriented films obtained by being cured. As reactive groups, acryloyl group, for example, methacryloyl group, azido group, epoxy group, etc. may be mentioned.

Moreover, optical anisotropy layers comprising inclined alignment layer of discotic liquid crystal is used as an optical compensation retardation layer. As discotic liquid crystals, a liquid crystal indicated in Japanese Patent Laid-Open No. 8-94836(1996) official report etc. may be illustrated.

Besides, the above-mentioned liquid crystal monomers and liquid crystal polymers may be developed on oriented films. As oriented films, various kinds of films conventionally known may be used, for example, there may be used films in which a thin film comprising polyimides or polyvinylalcohols, etc. is formed on a transparent base material, and then rubbing processing is given thereto; stretched films obtained by stretching processing of transparent films; and polymers in which polarized ultraviolet rays are irradiated to polymers having cinnamate skeleton and azobenzene skeleton, or polyimides.

The coating solution can be prepared, for example, by dissolving or dispersing the liquid crystal monomer and so on in an appropriate solvent. The solvent is not particularly limited. For example, the following can be used: a halogenated hydrocarbon such as chloroform, dichloromethane, tetrachlorocarbon, dichloroethane, tetrachloroethane, methylene chloride, trichloroethylene, tetrachloroethylene, chlorobenzene or o-dichlorobenzene; a phenolic compound such as phenol, p-chlorophenol, o-chlorophenol, m-cresol, o-cresol, or p-cresol; an aromatic hydrocarbon such as benzene, toluene, xylene, methoxybenzene, or 1,2-dimethoxybenzene; a ketone solvent such as acetone, methyl ethyl ketone (MEK), methyl isobutyl ketone, cyclohexanone, cyclopentanone, 2-pyrrolidone, or N-methyl-2-pyrrolidone; an ester solvent such as ethyl acetate or butyl acetate; an alcoholic solvent such as t-butyl alcohol, glycerin, ethylene glycol, triethylene glycol, ethylene glycol monomethyl ether, diethylene glycol dimethyl ether, propylene glycol, dipropylene glycol, or 2-methyl-2,4-pentanediol; an amide solvent such as dimethylformamide or dimethylacetoamide; a nitrile solvent such as acetonitrile or butyronitrile; an ether solvent such as diethyl ether, dibutyl ether, tetrahydrofuran or dioxane; or carbon disulfide, ethyl cellosolve or butyl cellosolve, and the like. Of these, preferred are toluene, xylene, mesitylene, MEK, methyl isobutyl ketone, cyclohexanone, ethyl cellosolve, butyl cellosolve, ethyl acetate, butyl acetate, propyl acetate, and ethyl acetate cellosolve. These solvents may be used, for example, alone or in a mixture of two or more thereof.

A resin component concentration of a coating liquid is not especially limited, but is usually 1 through 60% by weight, and preferably 5 to 50% by weight. Various kinds of additives may be included to the coating liquid according to usages to which a coated layer formed from the coating liquid is applied.

The constituent elements of the cholesteric layer which forms the optically compensating layer preferably constitute, for example, a non-liquid-crystal polymer wherein an oriented liquid crystal monomers having a cholesteric structure are polymerized or crosslinked. As will be described later, in the case of such a structure, the monomer exhibits liquid crystallinity, whereby the monomers can be oriented to have a cholesteric structure, and further the orientation can be fixed by polymerizing the monomers. The liquid crystal monomer is used but the polymer obtained by the polymerization becomes non-liquid-crystalline by the fixation. For this reason, the formed cholesteric layer has a cholesteric structure such as a cholesteric liquid crystal phase, but is not made of liquid crystal molecules; therefore, there is not caused, for example, a change between liquid crystal phase, glass phase and crystal phase based on temperature-change, the change being peculiar to liquid crystal molecules. Accordingly, the resultant layer is a very stable optical film (cholesteric layer), the cholesteric structure of which is not affected by temperature-change. Thus, the film is particularly suitable as, for example, a phase difference film for optical compensation (an optically compensating plate).

The above-mentioned liquid crystal monomer is preferably a monomer represented by a chemical formula (1) which will be illustrated later. Such a liquid crystal monomer is generally a nematic liquid crystal monomer. However, the monomer is twisted with the above-mentioned chiral agent. Thus, at last the monomer comes to have a cholesteric structure. In the cholesteric layer, the molecules of the monomer need to be polymerized or crosslinked for the fixation; it is therefore preferred that the monomer contains at least one of a polymerizable monomer and a crosslinkable monomer.

It is preferred that the cholesteric layer further contains at least one of a polymerization agent and a crosslinking agent. There can be used, for example, an ultraviolet curing agent, optically curing agent, a thermally curing agent or some other substance.

The ratio of the liquid crystal monomer in the cholesteric layer is preferably from 75 to 95% by weight, more preferably from 80 to 90% by weight. The ratio of the chiral agent to the liquid crystal monomer is preferably from 5 to 23% by weight, more preferably from 10 to 20% by weight. The ratio of the crosslinking agent or the polymerization agent to the liquid crystal monomer is preferably from 0.1 to 10% by weight, more preferably from 0.5 to 8% by weight, in particular preferably from 1 to 5% by weight.

The thickness of the optical film (the cholesteric layer) is not particularly limited. When the film is used as, for example, a phase difference film (an optically compensating plate) for compensation or the like, the thickness is preferably from 0.1 to 10 μm, more preferably from 0.5 to 8 μm, in particular preferably from 1 to 5 μm from the viewpoint of the prevention of orientation disturbance or a fall in the transmittance, selective reflectivity, coloration prevention, productivity and so on.

The optical film (the cholesteric layer) of the invention may be, for instance, made of a cholesteric layer alone as described above, or may be a laminate which has a substrate on which the cholesteric is laminated.

Furthermore, the optical film (cholesteric layer) producing process of the invention is a process for producing an optical film containing a cholesteric layer having oriented constituent molecules having a cholesteric structure, comprising:

the step of (1) developing, onto an oriented substrate (a substrate film), a coating solution comprising a liquid crystal monomer, a chiral agent, and at least one of a polymerization agent and a crosslinking agent wherein the ratio of the chiral agent to the liquid crystal monomer is within a given range, thereby forming a developed layer (a coating layer);

the step (2) of blowing dry wind along the traveling direction of the oriented substrate onto the surface of the developed layer;

the step (3) of subjecting the developed layer to heating treatment so as to orient the liquid crystal monomer so as to have a cholesteric structure, and the step (4) of subjecting the developed layer to at least one of polymerizing treatment and crosslinking treatment in order to fix the orientation of the liquid crystal monomer to form a cholesteric layer made of a non-liquid-crystal polymer. According to such a production process, an optical film having a predetermined selectively reflective wavelength band can be produced. In other words, it has been found out that the selectively reflective wavelength band can be controlled to a predetermined range by controlling the blend ratio between the liquid crystal monomer and the chiral agent.

The following will specifically describe one example of the optical film producing process of the invention. First, prepared is a coating solution containing the liquid crystal monomer, the chiral agent and at least one of the crosslinking agent and the polymerization agent.

Preferably, the liquid crystal monomer is, for example, a nematic liquid crystal monomer. Specific examples thereof include monomers represented by the following formula (1). These liquid crystal monomers may be used alone or in combination of two or more thereof.

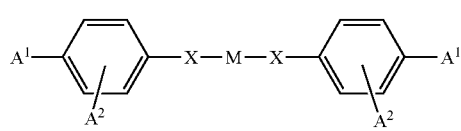

(1)

In the formula (1), any $A^1$ and any $A^2$ each represent a polymerizable group, and may be the same as or different. Either of the $A^1$ and the $A^2$ may be hydrogen. Xs each represent a single bond, —O—, —S—, —C=N—, —O—CO—, —CO—O—, —O—CO—O—, —CO—NR—, —NR—CO—, —NR—, —O—CO—NR—, —NR—CO—O—, —CH$_2$—O— or —NR—CO—NR, wherein R represents H or a $C_1$-$C_4$ alkyl. M represents a mesogen group.

In the formula (1), Xs may be the same or different, and are preferably the same.

In the monomers of the formula (1), each of $A^2$'s is preferably arranged at an ortho position to the corresponding $A^1$.

Preferably, the $A^1$ and the $A^2$ are each independently represented by the following formula:

(2)

Preferably, the $A^1$ is equal to the $A^2$.

In the formula (2), Z represents a crosslinkable group, and X is the same as in the formula (1). Sp represents a spacer made of a linear or branched alkyl group having 1 to 30 C atoms, and n represents 0 or 1. About carbon chains in the Sp, the following may be incorporated thereinto: for example, oxygen in an ether functional group, sulfur in a thioether functional group, a non-adjacent imino group, or a $C_1$-$C_4$ alkylimino group.

In the formula (2), Z is preferably any one of atomic groups represented by the following formulae. In the formulae, examples of each R include methyl, ethyl, n-propyl, i-propyl, n-butyl, i-butyl and t-butyl groups.

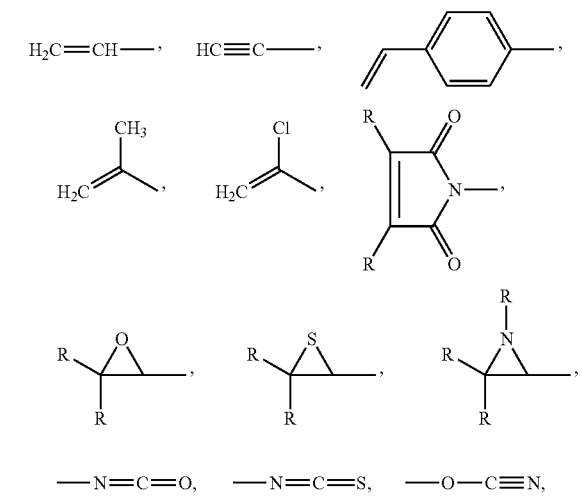

In the formulas (2), Sp is preferably any one of atomic groups represented by the following formulae. In the formulae, m is preferably from 1 to 3, and p is preferably from 1 to 12.

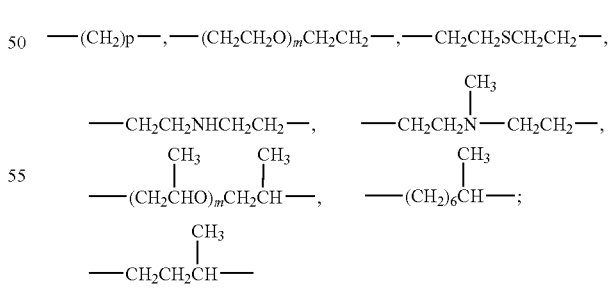

In the formula (1), M is preferably represented by the following formula (3). In the formula (3), Xs are equal to Xs in the formula (1). Q represents, for example, a substituted or unsubstituted alkylene or aromatic hydrocarbon atomic group. Q may be, for example, a substituted or unsubstituted linear or branched $C_1$-$C_{12}$ alkylene.

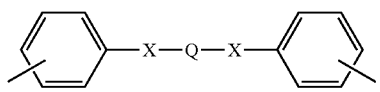
(3)

When Q is the aromatic hydrocarbon aromatic group, preferred examples of Q are atomic groups represented by the following formulae, and substituted analogues thereof.

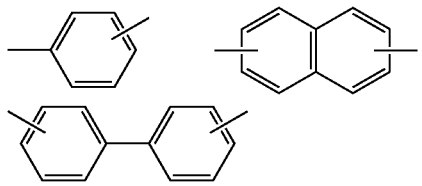

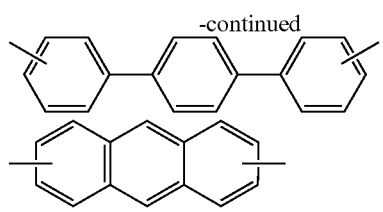
-continued

About the substituted analogues of the aromatic hydrocarbon atomic groups represented by the formulae illustrated above, for example, any one of the aromatic rings may have 1 to 4 substituents, and any one of the aromatic rings or groups may have 1 or 2 substituents. The substituents may be the same or different. Examples of the substituents include C1-C4 alkyls, nitro, halogens such as F, Cl, Br and I, phenyl, and $C_1$-$C_4$ alkoxyls.

Specific examples of the above-mentioned liquid crystal monomer include monomers represented by the following formulae (4) to (19):

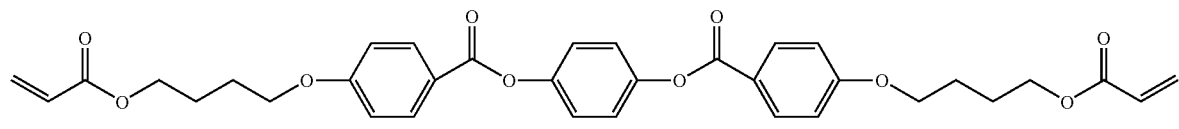
(4)

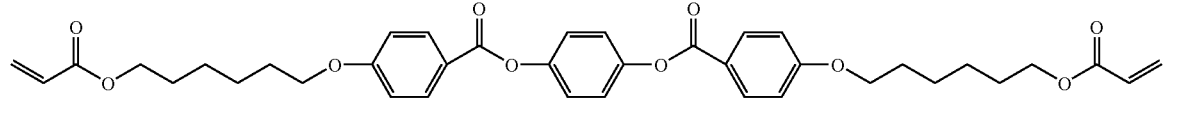
(5)

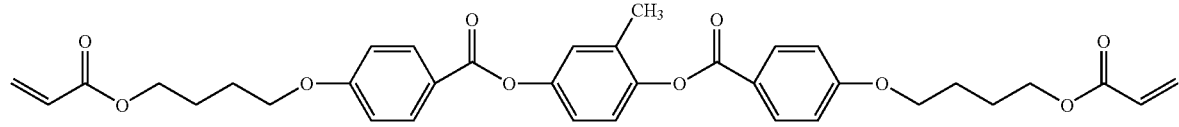
(6)

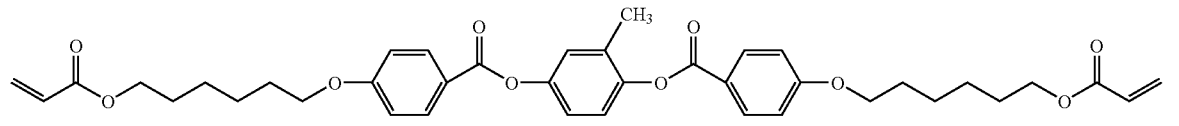
(7)

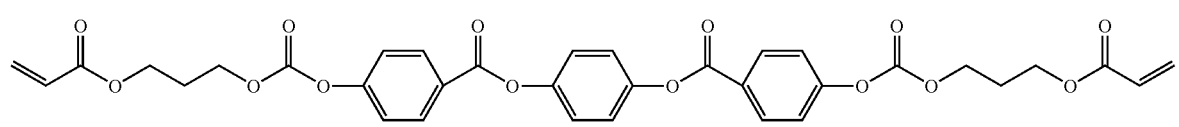
(8)

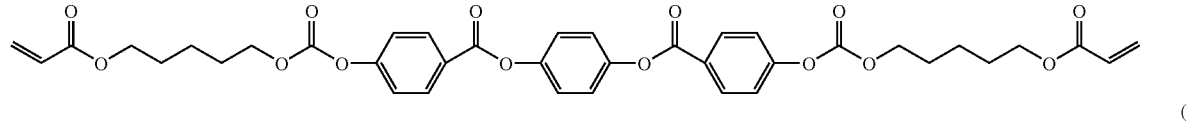
(9)

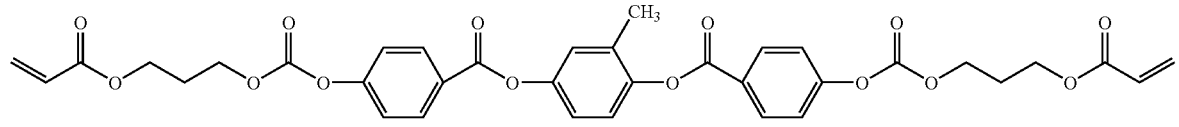
(10)

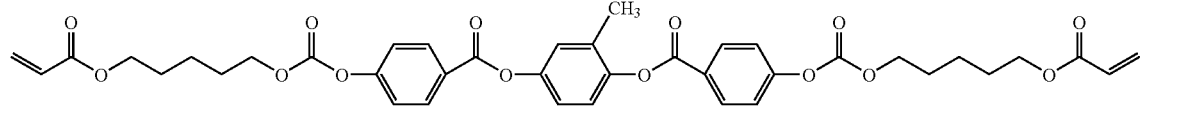
(11)

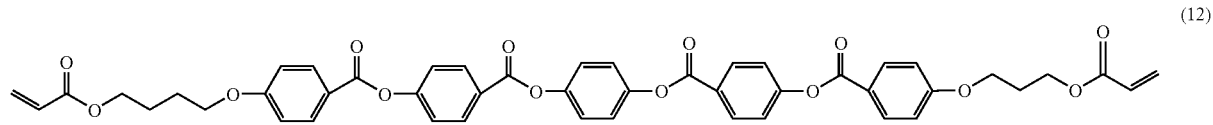
(12)
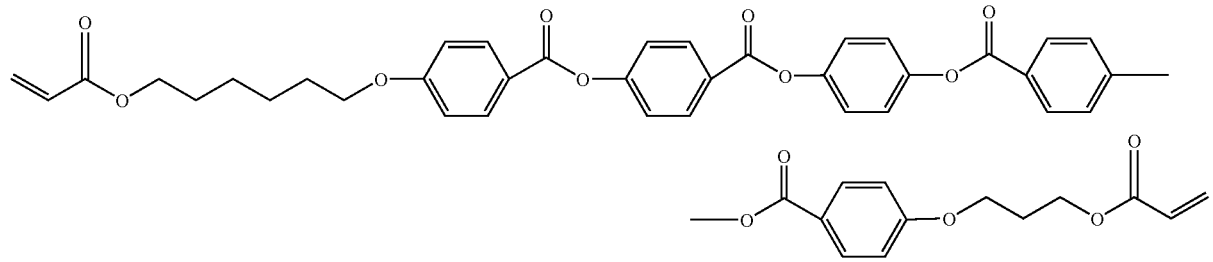
(13)
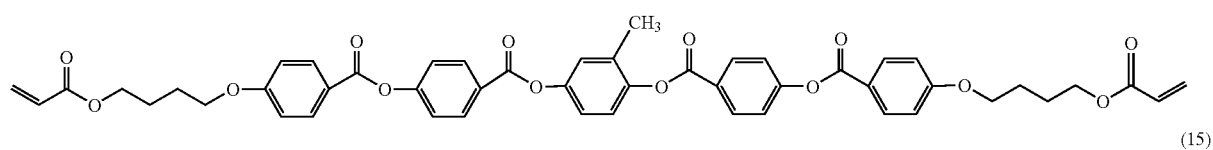
(14)
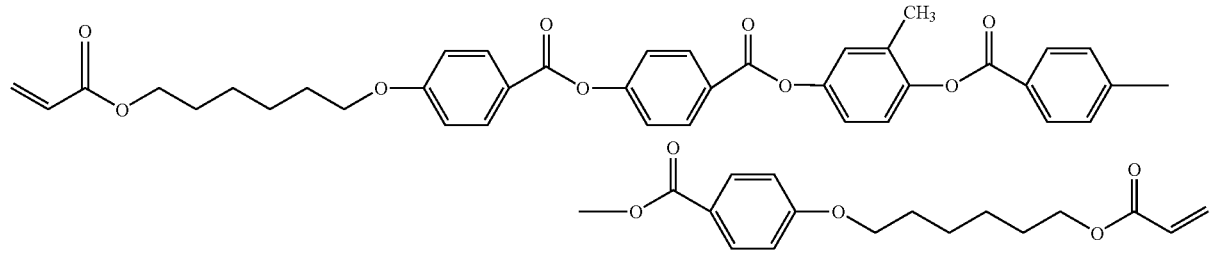
(15)
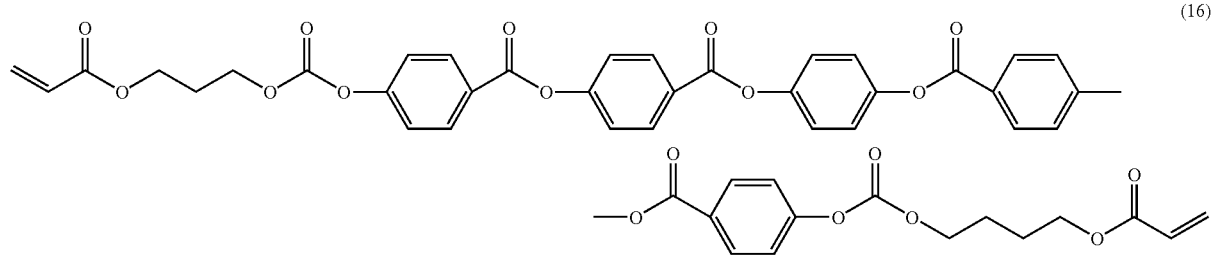
(16)
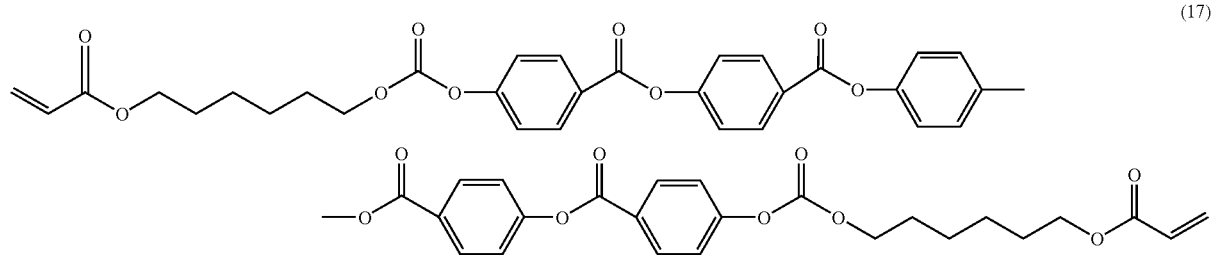
(17)
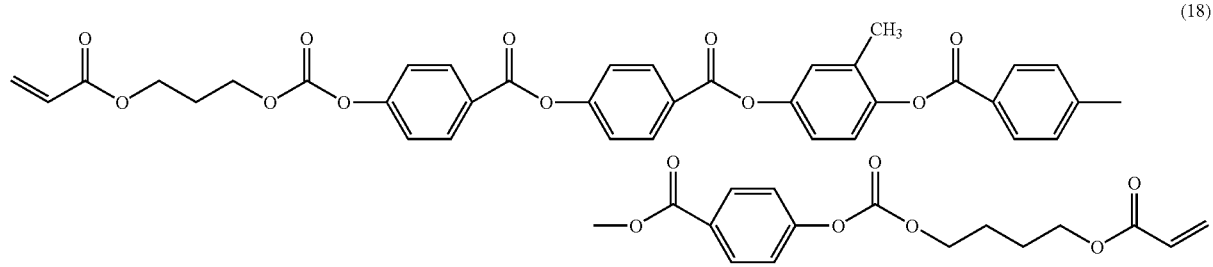
(18)

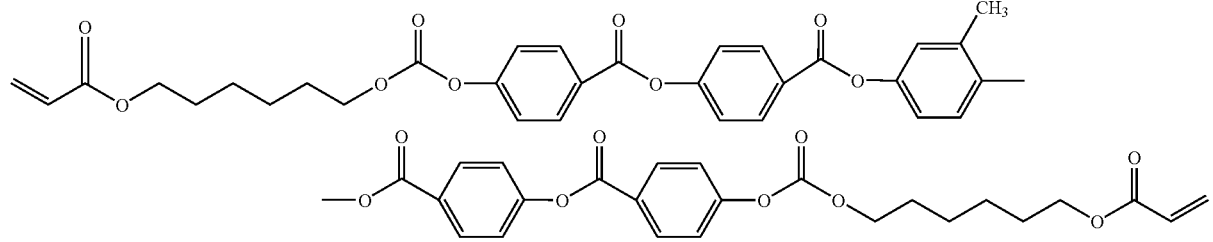

The temperature range wherein the liquid crystal monomer exhibits liquid crystallinity varies in accordance with the kind thereof. For example, the range is preferably from 40 to 120° C., more preferably from 50 to 100° C., in particular preferably from 60 to 90° C.

The chiral agent is not particularly limited if the agent is, for example, an agent that causes the liquid crystal monomer to be twisted and oriented to have a cholesteric structure as described above. The chiral agent is preferably a polymerizable chiral agent, and may be a material as described above. These chiral agents may be used alone or in combination of two or more thereof.

Specific examples of the polymerizable chiral agent that can be used include chiral compounds represented by the following general formulae (20) to (23):

  (20)

  (21)

  (22)

  (23)

In each of the formulae, Z is the same as in the formula (2), Sp is the same as in the formula (2), $X^2$, $X^3$ and $X^4$ each independently represent a chemical single bond, —O—, —S—, —O—CO—, —CO—O—, —O—CO—O—, —CO—NR—, —NR—CO—, —O—CO—NR—, —NR—CO—O—, or —NR—CO—NR— wherein the R represents N or a $C_1$-$C_4$ alkyl; $X^5$ represents a chemical single bond, —O—, —S—, —O—CO—, —CO—O—, —O—CO—O—, —CO—NR—, —NR—CO—, —O—CO—NR—, —NR—CO—O—, —NR—CO—NR—, —CH$_2$O—, —O—CH$_2$—, —C═N—, —N═CH— or —N═N—; R represents H or a C1-C4 alkyl as described above; M represents a mesogen group as described above; $P^1$ represents hydrogen, a C1-C30 alkyl group substituted with 1 to 3 C1-C6 alkyls, a C1-C30 acyl group, or a C3-C8 cycloalkyl group; n is an integer of 1 to 6; and Ch represents a chiral group the valence of which is n. In the formula (23), it is preferred that at least one of $X^3$ and $X^4$ is —O—CO—O—, —O—CO—NR—, —NR—CO—O— or —NR—CO—NR—. When $P^1$ is an alkyl, acyl or cycloalkyl group in the formula (22), it is allowable to incorporate, into the carbon chain(s) thereof, for example, oxygen in an ether functional group, sulfur in a thioether functional group, a non-adjacent imino group, or a C1-C4 alkylimino group.

Examples of the chiral group of Ch include atomic groups represented by the following formulae:

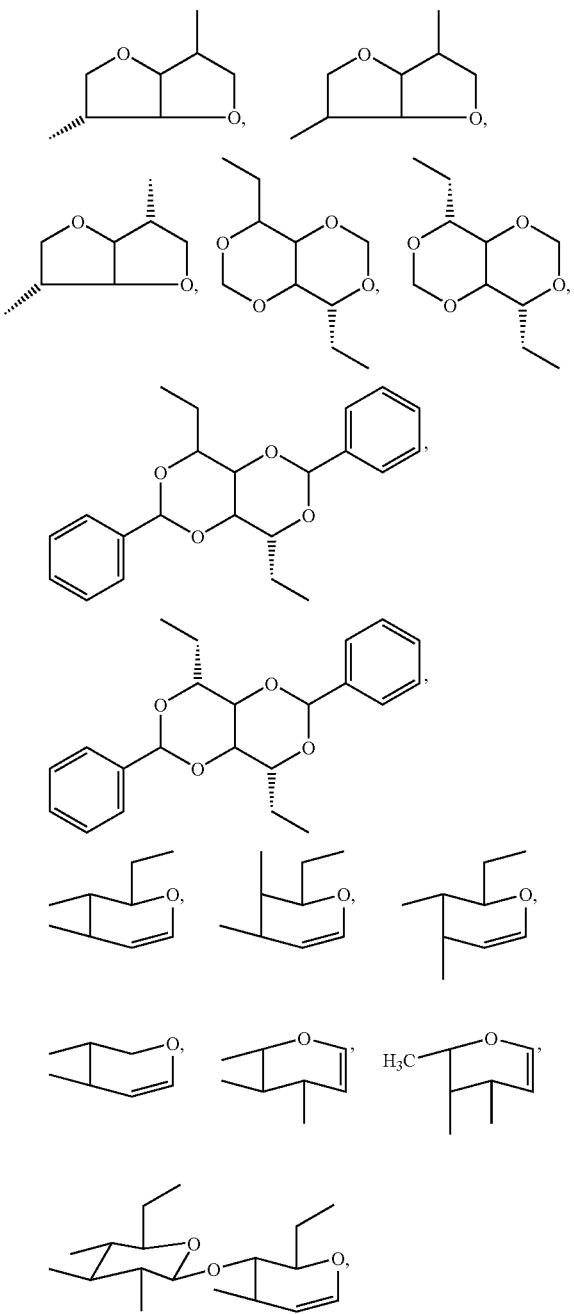

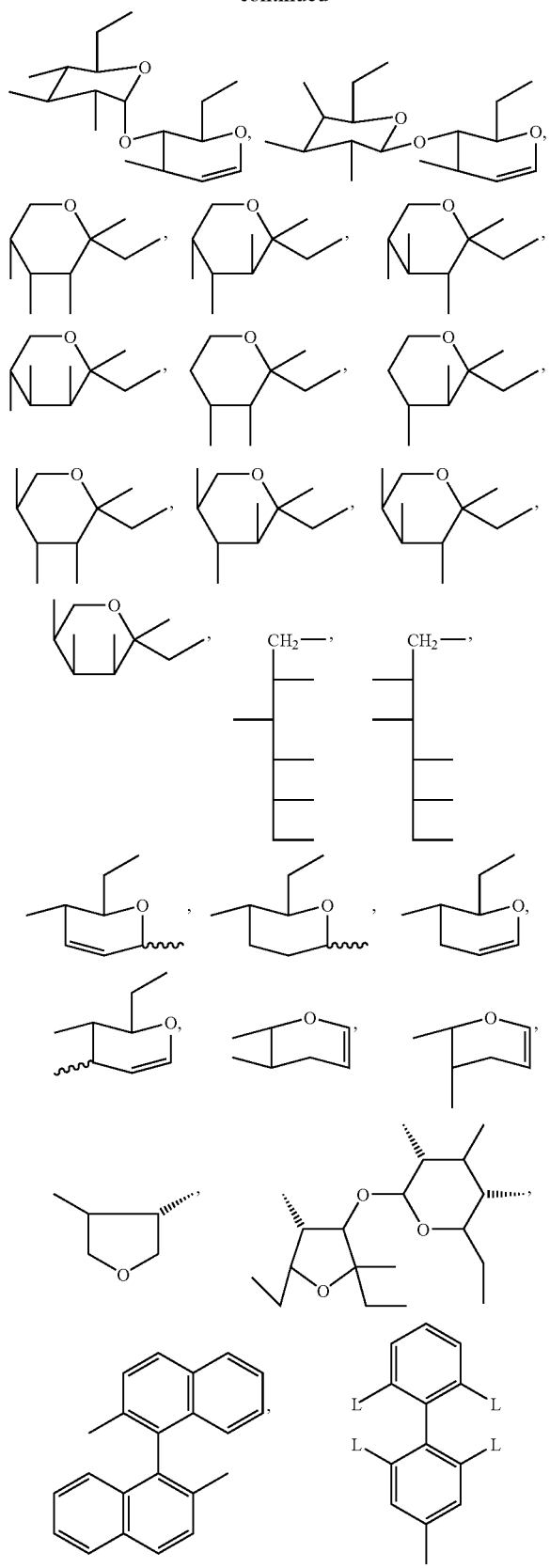

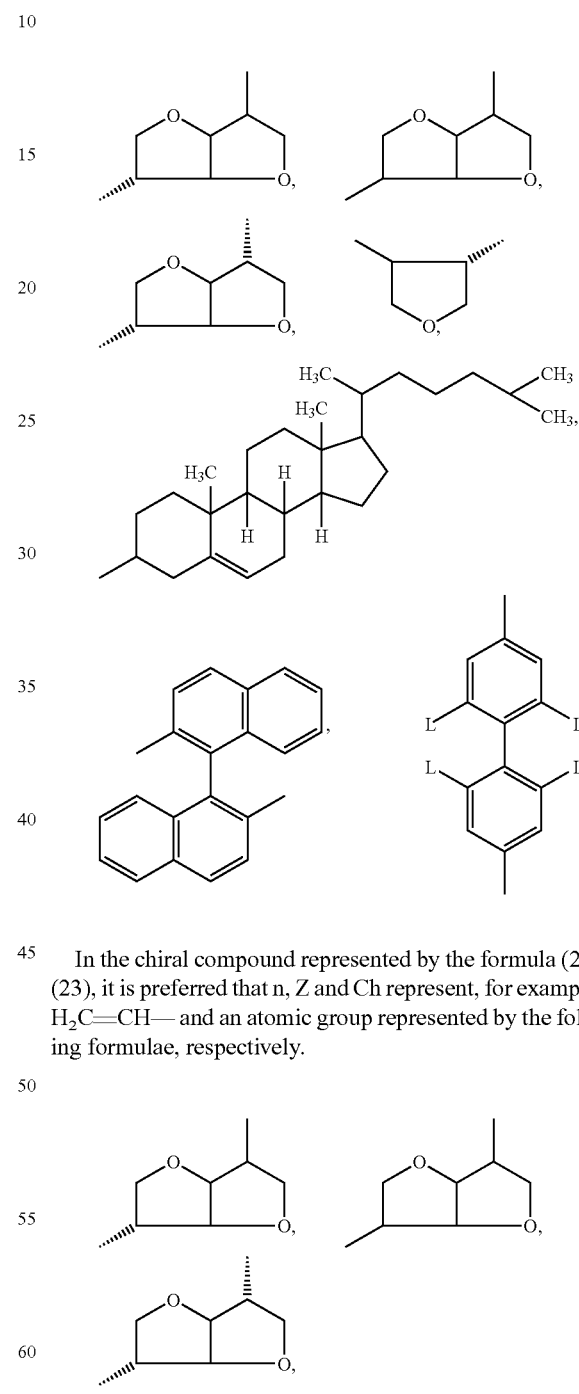

In the atomic groups, any L represents a C1-C4 alkyl, a C1-C4 alkoxy, a halogen, COOR, OCOR, CONHR or NHCOR wherein R represents a C1-C4 alkyl. Any terminal in the atomic groups represented by the formulae represents a bonding hand to an adjacent group.

Of the above-mentioned atomic groups, particularly preferred are atomic groups represented by the following formulae:

In the chiral compound represented by the formula (21) or (23), it is preferred that n, Z and Ch represent, for example, 2, $H_2C=CH-$ and an atomic group represented by the following formulae, respectively.

Specific examples of the chiral compound include compounds represented by the following formulae (24) to (44). In these chiral compounds, twist force is $1\times10^{-6}$ $nm^{-1}$(% by weight)$^{-1}$ or more.

(24)
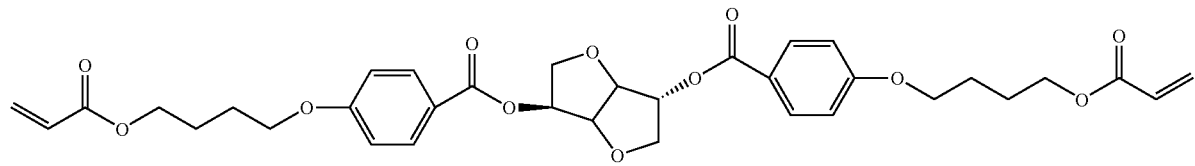
(25)
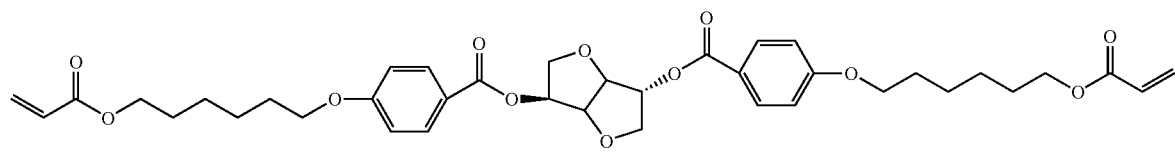
(26)
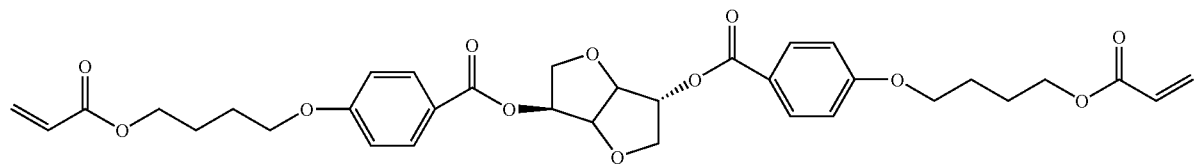
(27)
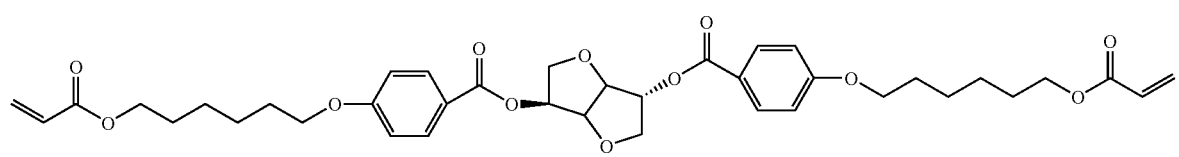
(28)
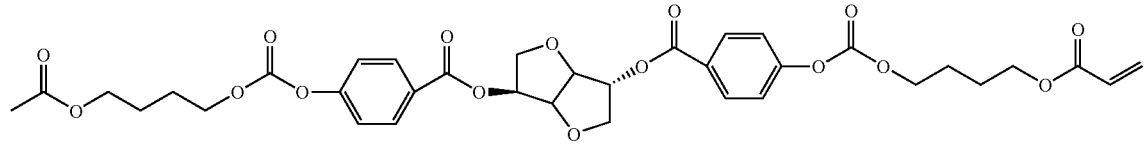
(29)
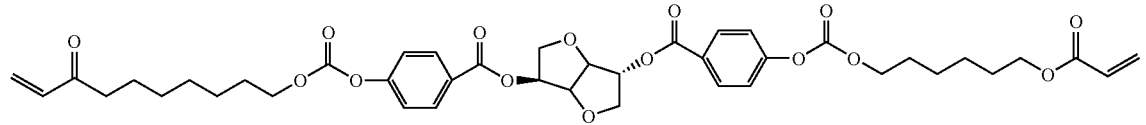
(30)
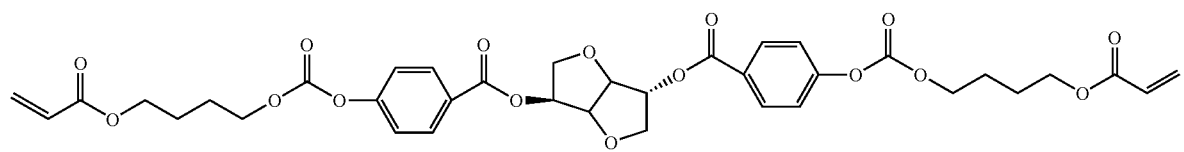
(31)
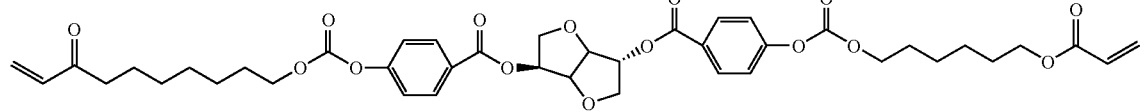
(32)
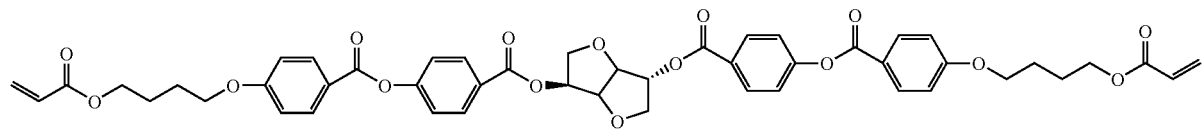

(33)
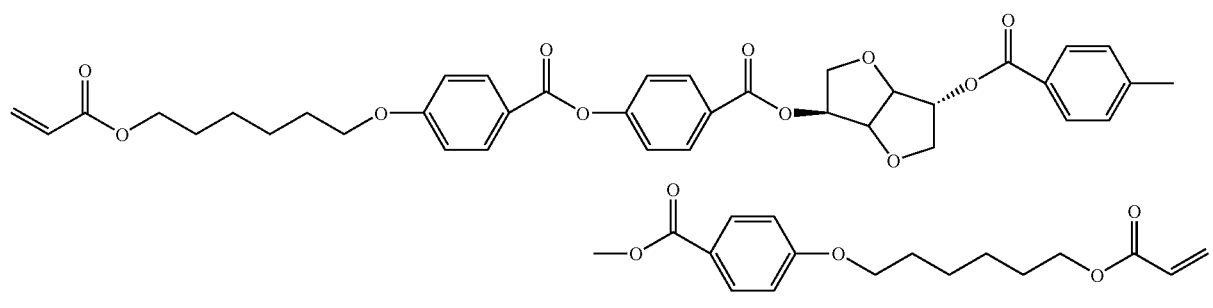
(34)
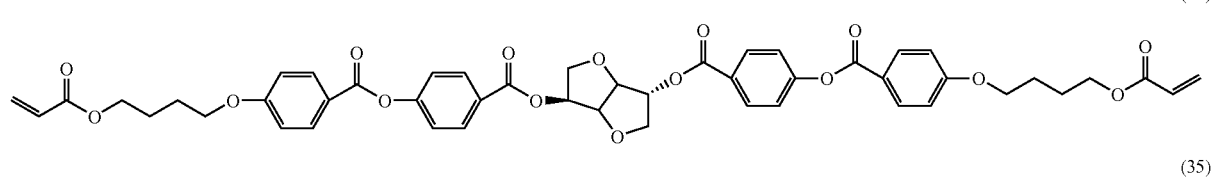
(35)
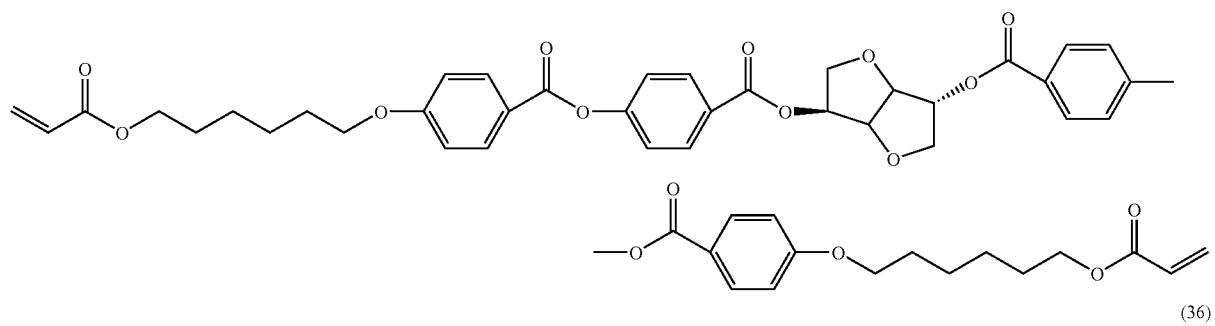
(36)
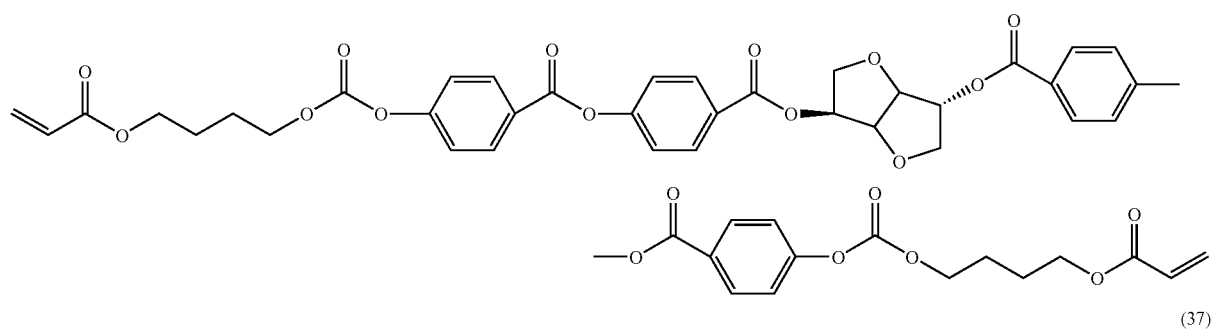
(37)
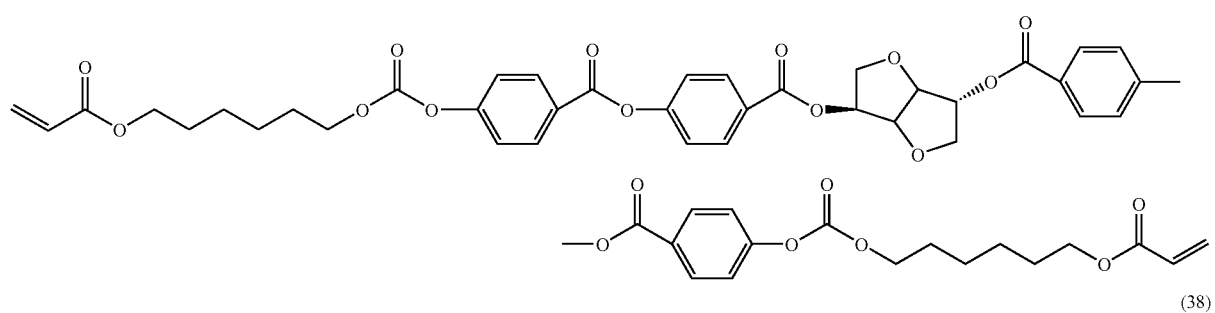
(38)
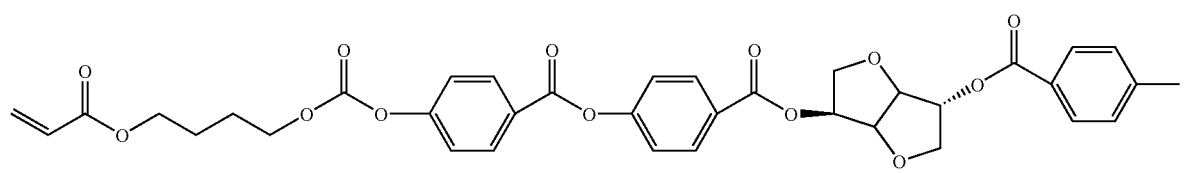

-continued
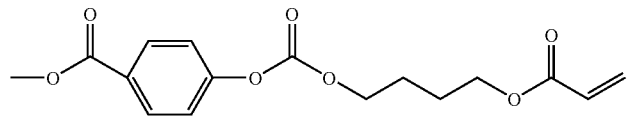
(39)
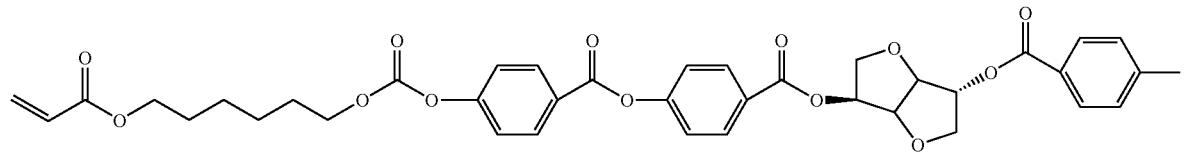
(40)
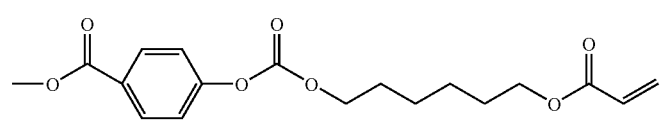
(41)
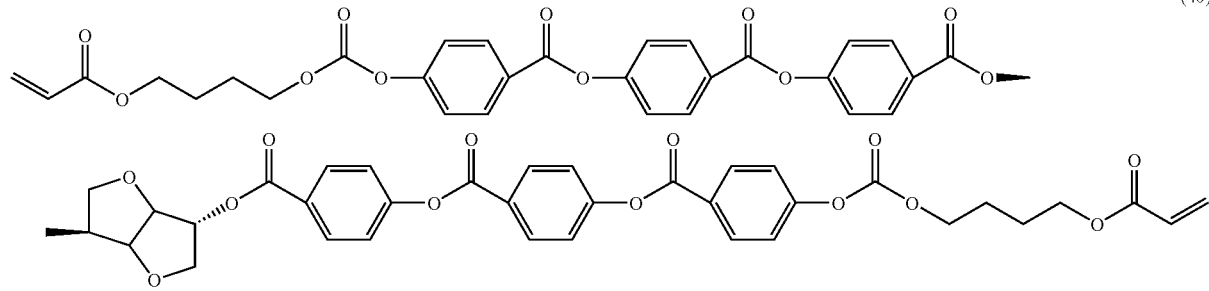
(42)
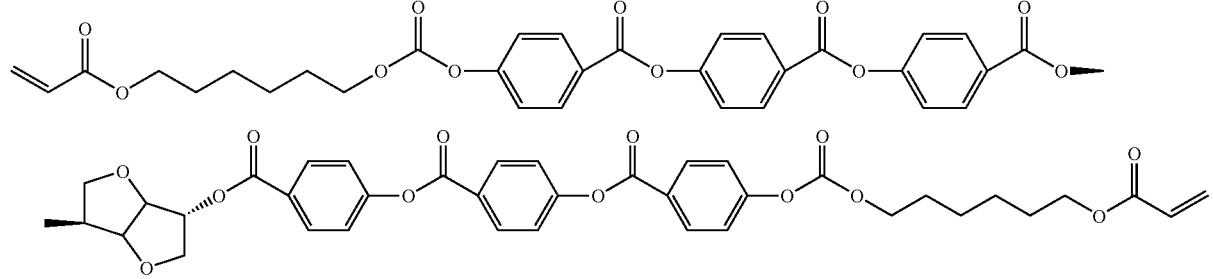
(43)
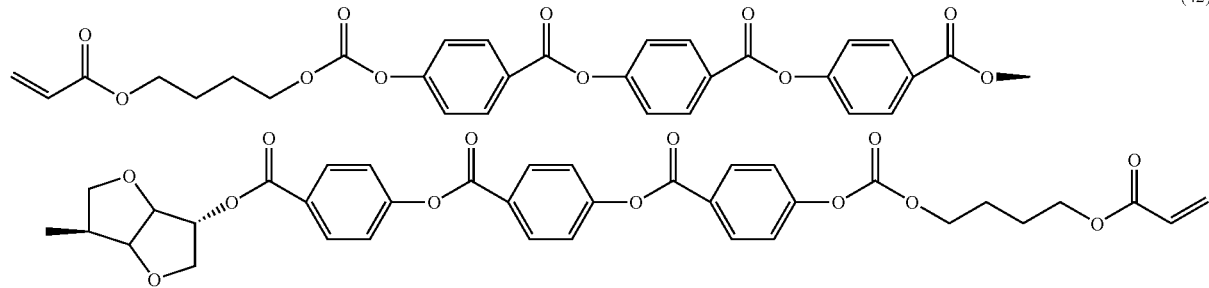

-continued

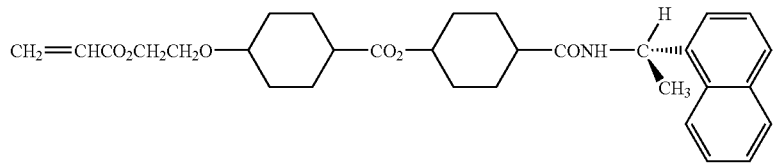

(44)

Besides the above-mentioned chiral compounds, for example, chiral compounds described in DE-A 4342280, and DE Patent Application No. 19520660.6 and No. 19520704.1 can be preferably used.

The polymerization agent and the crosslinking agent are not particularly limited. For example, the following can be used. As the polymerization agent, for example, benzoyl peroxide (BPO) or azobisisobutyronitrile (AIBN) can be used. As the crosslinking agent, for example, an isocyanate based crosslinking agent, an epoxy based crosslinking agent or a metal chelate crosslinking agent can be used. These may be used alone or in combination of two or more thereof.

The addition ratio of the chiral agent is appropriately decided in accordance with, for example, a desired spiral pitch and a desired selectively reflective wavelength band. The addition ratio thereof to the liquid crystal monomer is from 5 to 23% by weight, preferably from 10 to 20% by weight. As described above, the addition ratio between the liquid crystal monomer and the chiral agent is controlled in this way, whereby the selectively reflective wavelength band of the formed optical film can be set into the above-mentioned range. If the ratio of the chiral agent to the liquid crystal monomer is less than 5% by weight, the selectively reflective wavelength band of the formed optical film is not easily controlled toward lower wavelengths. If the ratio is more than 23% by weight, the temperature range wherein the liquid crystal monomer undergoes cholesteric orientation, that is, the temperature range wherein the liquid crystal monomer turns into a liquid crystal phase becomes narrow. It is therefore necessary to perform strict temperature control in an orienting step that will be described later. Thus, the production becomes difficult.

For example, when a chiral agent having a constant twist force is used, the formed selectively reflective wavelength band goes toward lower wavelengths as the addition ratio of the chiral agent to the liquid crystal monomer is larger. For example, when the addition ratio of the chiral agent to the liquid crystal monomer is constant, the selectively reflective wavelength band of the formed optical film goes toward lower wavelengths as the twist force of the chiral agent is larger. Specifically, when the selectively reflective wavelength band of the formed optical film is set into the range of 200 to 220 nm, it is advisable to incorporate, for example, a chiral agent having a twist force of $5\times10^{-4}$ $nm^{-1}$ (% by weight)$^{-1}$ into the liquid crystal monomer at a ratio of 11 to 13% by weight of this monomer. When the selectively reflective wavelength band is set into the range of 290 to 310 nm, it is advisable to incorporate, for example, a chiral agent having a twist force of $5\times10^{-4}$ $nm^{-1}$ (% by weight)$^{-1}$ into the liquid crystal monomer at a ratio of 7 to 9% by weight of this monomer.

The combination of the liquid crystal monomer with the chiral agent is not particularly limited. Specific examples thereof include a combination of the monomer agent of the formula (10) with the chiral agent of the formula (38), and a combination of the monomer agent of the formula (11) with the chiral agent of the formula (39).

The addition ratio of the crosslinking agent or the polymerization agent to the liquid crystal monomer is, for example, from 0.1 to 10% by weight, preferably from 0.5 to 8% by weight, more preferably from 1 to 5% by weight. When the ratio of the crosslinking agent or the polymerization agent to the liquid crystal monomer is 0.1% by weight or more, for example, the curing of the cholesteric layer becomes sufficiently easy. When the ratio is 10% by weight or less, for example, the temperature range wherein the liquid crystal monomer undergoes cholesteric orientation, that is, the temperature at which the liquid crystal monomer turns into a liquid crystal phase becomes a sufficient range. Consequently, temperature control in the orientating step that will be described later becomes still easier.

If necessary, for example, various additives may be appropriately incorporated into the coating solution. Examples of the additives include an antioxidant, a modifier, a surfactant, a dye, a pigment, a discoloration inhibitor, and an ultraviolet absorber. For example, these additives may be added alone or in combination of two or more thereof. Specifically, as the antioxidant, there can be used an agent known in the prior art, such as a phenolic compound, an amine compound, an organic sulfur compound, or a phosphine compound. As the modifier, there can be used an agent known in the prior art, such as a glycol compound, a silicone or an alcohol. The surfactant can be added, for example, in order to make the surface of the optical film smooth. Specifically, for example, a silicone, acrylic or fluorine-containing surfactant can be used. The silicone surfactant is particularly preferred.

In the case of using the liquid crystal monomer in this way, the prepared coating solution exhibits a viscosity good for works such as coating and development. The viscosity of the coating solution is usually varied in accordance with the concentration and the temperature of the liquid crystal monomer, and other factors. When the monomer concentration in the coating solution is from 5 to 70% by weight, the viscosity is, for example, from 0.2 to 20 mPa·s, preferably from 0.5 to 15 mPa·s, more preferably from 1 to 10 mPa·s. Specifically, when the monomer concentration in the coating solution is 30% by weight, the viscosity is, for example, from 2 to 5 mPa·s, preferably from 3 to 4 mPa·s. When the viscosity of the coating solution is 0.2 mPa·s or more, for example, the generation of solution-flow, based on the traveling of the coating solution, can be even further prevented. When the viscosity is 20 mPa·s or less, for example, the surface smoothness is even better and the unevenness of the thickness can be further prevented. Thus, the applicability or paintability is also good. As the viscosity, viscosity in the temperature range of 20 to 30° C. is described. However, no limitation is imposed into the temperatures.

Next, the coating solution is applied onto an oriented substrate to form a developed layer.

It is advisable to develop the coating solution while causing the solution to flow by a method known in the prior art, such as a roll coating, spin coating, wire bar coating, dip coating, extrusion coating, curtain coating, or spray coating method. Of these, spin coating and extrusion coating are preferred from the viewpoint of coating efficiency.

The oriented substrate is not particularly limited if the substrate is capable of orienting the liquid crystal monomers. For example, a product wherein the surface of any one of various plastic films or plastic sheets is subjected to rubbing treatment with rayon cloth or the like can be used. The plastics are not particularly limited. Examples thereof include triacetylcellulose (TAC), polyolefins such as polyethylene, polypropylene and poly(4-methylpentene-1), polyimide, polyimideamide, polyetherimide, polyamide, polyetheretherketone, polyetherketone, polyketonesulfide, polyethersulfone, polysulfone, polyphenylenesulfide, polyphenyleneoxide, polyethylene terephthalate, polybutylene terephthalate, polyethylene naphthalate, polyacetal, polycarbonate, polyarylate, acrylic resin, polyvinyl alcohol, polypropylene, cellulose plastics, epoxy resin, and phenol resin. There can be also used products wherein a plastic film or sheet as described above is laminated on the surface of a metallic substrate made of aluminum, copper, iron or the like, a ceramic substrate, a glass substrate or the like, or products wherein an obliquely vapor-deposited $SiO_2$ film is formed on the above-mentioned surface. Furthermore, there can be used a laminate wherein a drawn film which has birefringence and is obtained by drawing such as monoaxial drawing, is laminated as an oriented film onto a plastic film or sheet as described above. The case that a substrate itself has birefringence is preferred since it is unnecessary to conduct rubbing treatment or laminate a birefringent film onto the surface, as described above. The method for giving birefringence to a substrate itself in this way may be a method of performing casting, extrusion molding or the like besides the drawing treatment in the formation of the substrate.

Subsequently, the developed layer is subjected to heating treatment, thereby orienting the liquid crystal monomer in a liquid crystal state. Since the developed layer contains the chiral agent together with the liquid crystal monomer, the liquid crystal monomer which falls into a liquid crystal phase (liquid crystal state) is oriented in the state that the monomer is twisted by the chiral agent. That is, the liquid crystal monomer exhibits a cholesteric structure (spiral structure).

Temperature conditions for the heating treatment are appropriately decided in accordance with, for example, the kind of the liquid crystal monomer, specifically, the temperature at which the liquid crystal monomer exhibits liquid crystallinity. The temperature is usually from 40 to 120° C., preferably from 50 to 100° C., more preferably from 60 to 90° C. When the temperature is 40° C. or higher, usually the liquid crystal monomer can be sufficiently oriented. When the temperature is 120° C. or lower, the choice of various oriented substrates as described above is wide from the viewpoint of, for example, heat resistance.

Next, the developed layer wherein the liquid crystal monomer is oriented is subjected to crosslinking treatment or polymerizing treatment, thereby polymerizing or crosslinking the liquid crystal monomers and the chiral agent. In this way, the liquid crystal monomers are polymerized/crosslinked between its molecules or polymerized/crosslinked with the chiral agent in the state that the monomers are oriented to have the cholesteric structure. Consequently, the oriented state is fixed. The formed polymer is turned to a non-liquid-crystal polymer by action of the fixation of the oriented state.

The polymerizing treatment or the crosslinking treatment can be appropriately decided in accordance with, for example, the kind of the used polymerization agent or crosslinking agent. For example, in the case that a photopolymerization agent or optically crosslinking agent is used, light should be radiated. In the case that an ultraviolet polymerization agent or ultraviolet crosslinking agent is used, ultraviolet rays should be radiated.

Such a production process gives, onto the oriented substrate, an optical film having a selectively reflective wavelength band of 100 nm to 320 nm and made of the oriented non-liquid-crystal having the cholesteric structure. This optical film is non-liquid-crystalline since the orientation thereof is fixed as described above. Accordingly, the optical film does not change between liquid crystal phase, glass phase and crystal phase by temperature-change, and does not undergo orientation change in accordance with temperature. For this reason, the film can be used as a high-performance phase difference film which is not affected by temperature. Light leakage and so on, as described above, are restrained since the selectively reflective wavelength band is controlled into the above-mentioned range.

The production process of the invention is not limited to any process for forming an optical film from a non-liquid-crystal polymer. Thus, a liquid crystal polymer as described above may be used. As described above, it is allowable to incorporate, into the above-mentioned nematic liquid crystal monomer or liquid crystal polymer, a cholesteric liquid crystal monomer or a chiral agent so as to exhibit a cholesteric phase in a liquid crystal state. About a cholesteric liquid crystal polymer also, the liquid crystal polymer is oriented in the state of a cholesteric structure, whereby the same advantageous effects as in the process for forming an optical film from a non-liquid-crystal polymer can be obtained.

When a liquid crystal monomer is used, the selectively reflective wavelength band is even more easily controlled. Additionally, the viscosity and others of the coating solution are easily set as described above. Accordingly, a thin layer is more easily formed and the handleablility thereof is good. The surface of the formed cholesteric layer is also good in flatness. It can be therefore said that a thin optical film having an even better quality can be formed.

For example, it is allowable to peel the optical film from the oriented substrate and then use the film, as it is, as a phase difference film (an optically compensating plate) for compensation or the like, as described above, or use the optical film laminated on the oriented substrate as a phase difference plate.

When the optical film and the oriented substrate are used as a laminate, the oriented substrate is preferably a translucent plastic film. The plastic film may be a film made of a cellulose such as triacetylcellulose (TAC), a polyolefin such as polyethylene, polypropylene or poly(4-methylpentene-1), polyimide, polyamideimide, polyamide, polyetherimide, polyetheretherketone, polyketonesulfide, polyetherketone, polyethersulfone, polysulfone, polyphenylenesulfide, polyphenyleneoxide, polyethylene terephthalate, polybutylene terephthalate, polyethylene naphthalate, polyacetal, polycarbonate, polyarylate, acrylic resin, polyvinyl alcohol, polypropylene, cellulose-based plastic, epoxy resin, phenol resin, polynorbornene, polyester, polystyrene, polyvinyl chloride, polyvinylidene chloride, liquid crystal polymer, or the like. These films may be optically isotropic or anisotropic. Of these plastic films, a film made of polypropylene, polyethylene terephthalate or polyethylene naphthalate is preferred from the viewpoint of the solvent resistance and heat resistance.

A translucent oriented substrate as described above may be, for example, a mono-layer or a laminate wherein different polymers are laminated in order to improve, for example, the strength, heat resistance and adhesiveness to a polymer or liquid crystal monomer.

The substrate may be a substrate which does not generate any phase difference based on birefringence, or a substrate which generates a phase difference based on birefringence in order to cancel the polarized state of light reflected on a polarizing separation layer. The cancellation of such a polarized state causes an improvement in light available efficiency or the identification thereof with light source light, whereby the cancellation is effective for restraining hue change through the sense of sight. The transparent substrate which generates a phase difference by birefringence may be, for example, a drawn film made of any one of various polymers, and may be a substrate wherein the refractive index in the thickness direction is controlled. The above-mentioned control can be performed, for example, by bonding the polymer film onto a thermally shrinkable film and then drawing with heating the resultant.

The above-mentioned optical film can be transferred from the above-mentioned oriented substrate (referred to as "first substrate" hereinafter) to a different substrate (referred to as "second substrate" hereinafter). In the state that the optical film is laminated on the second substrate, the optical film can be used as, for example, a phase difference plate. Specifically, an adhesive layer or pressure sensitive adhesive layer (referred to as the "adhesive layer and so on" hereinafter) is laminated onto at least one surface of the second substrate, and this adhesive layer and so on are bonded onto the optical film on the first substrate. Thereafter, the first substrate is peeled from the optical film.

In this case, the oriented substrate on which the coating solution is to be developed is preferably selected from the viewpoint of, for example, the heat resistance and strength thereof as well as the light-transmissivity thickness thereof.

On the other hand, the second substrate is not limited about, for example, the heat resistance thereof. Preferred examples thereof include a translucent substrate and a translucent protective film. Specific examples thereof include a transparent glass and a transparent plastic film.

Preferably, the second substrate is, for example, optically isotropic. However, the substrate may be optically anisotropic in accordance with the usage of the optical film. Examples of the second substrate having such optical anisotropy include a phase difference film wherein the above-mentioned plastic film is subjected to drawing treatment or the like, a light-scattering film having light-scattering property, a diffractive film having diffractive power, and a polarizing film.

In the case that the cholesteric layer and any one of the various translucent substrates are made into a laminate, the cholesteric layer may be laminated on both faces of the translucent substrate. One or more out of a plurality of the cholesteric layers may be laminated.

About the optical film of the invention, a pressure sensitive adhesive layer or adhesive layer may be laminated on the surface thereof. Such lamination of the pressure sensitive adhesive layer or the like makes it possible to laminate other optical layers such as a polarizing plate, or members such as a liquid crystal cell thereon, thereby preventing the peeling of the optical film.

The following will describe a case where the optical device of the invention is a hard coat film. In this case, the hard coat layer can be constructed to have a hard coat layer as an optically functional layer and a transparent substrate film (substrate film 1). On the transparent substrate film side of the hard coat layer, a polarizer and an optical layer, such as a phase difference layer or an optically compensating layer, can be formed. Instead of the hard coat layer, an antireflective layer can be used.

The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent substrate in the above described illustration may be used. As the above described transparent protective film, a transparent protective film whose both sides, surface side and backside, are formed from same polymer material may be used, and also a transparent protective film whose both sides are formed by different polymer materials etc. may be used. Films excellent in transparency, mechanical strength, heat stability, moisture barrier property, etc. are preferably used. In many cases, transparent protective films having small degree of optical anisotropic property, such as retardation and the like, are preferable. As polymers forming the above-mentioned transparent protective film, triacetyl cellulose is optimal. When the above-mentioned hard coat film is formed on one side or both sides of a polarizer (polarizing plate), a transparent base material film of the hard coat film may serve also as a transparent protective film of the polarizer. Although a thickness of the transparent protective film is not especially limited, it is about 10 through 300 μm in general.

An antireflective polarizing plate having a polarizing plate laminated onto a hard coat film may be obtained by sequentially laminating a transparent protective film, a polarizer, and a transparent protective film, or otherwise a polarizer and a transparent protective film may be sequentially laminated onto a hard coat film.

As the opposite side of the polarizing-adhering surface above-mentioned transparent protective film, a film with a hard coat layer and various processing aiming for sticking prevention and diffusion or anti glare may be used. A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Besides, a sticking prevention processing is applied for the purpose of adherence prevention with adjoining layer. In addition, the above described hard coat layer and sticking prevention layer etc. may be built in the protective film itself, and also they may be prepared as an optical layer different from the protective layer.

In addition, a hard coat layer, a primer layer, a bonding adhesive layer, a pressure sensitive adhesive layer, an antistatic layer, a conductive layer, a gas barrier layer, a steam barrier layer, moisture barrier layer, etc. may be laminated between layers of a polarizing plate, and they may be laminated onto a surface of the polarizing plate. Moreover, in a stage where each layer of the polarizing plate is applied, for example, conductive grains, antistatic agents, various fine-grains, plasticizers, etc. may be added and mixed to formation materials of each layer, and thereby, improvement of characteristics may be given if needed.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflector, a transflector, a retardation plate (a half wavelength plate and a quarter wavelength plate included), and a viewing angle compensation film, may be used. Especially preferable polarizing plates are; a reflective type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate. A hard coat film is applied to a side of a polarizing plate of an elliptical polarizing plate, a polarizing plate with optical compensation, etc.

Furthermore, if needed, there may also be given treatments for giving various characteristics, various functions, etc., such as scratch-proof property, durability, weatherability, wet heat resistance, heat resistance, moisture resistance, water vapor permeability, antistatic property, conductivity, improvement in adhesion between layers, and improvement in mechanical strength, or insertion, lamination of functional layers, etc.

A reflective layer is prepared on a polarizing plate to give a reflective type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflective type polarizing plate may be formed using suitable methods, such as a method in which a reflective layer of metal etc. is, if required, attached to one side of a polarizing plate through a transparent protective layer etc.

As an example of a reflective type polarizing plate, a plate may be mentioned on which, if required, a reflective layer is formed using a method of attaching a foil and vapor deposition film of high-reflectance metals, such as aluminum, to one side of a matte treated protective film.

Instead of a method in which a reflector is directly given to the protective film of the above-mentioned polarizing plate, a reflector may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflective type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflective type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined alignment film etc. may be used. As inclined alignment film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350: manufactured by NITTO DENKO CORPORATION, Transmax: manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflective type elliptically polarizing plate or a semi-transmission type elliptically polarizing plate, etc. in which the above-mentioned reflective type polarizing plate or a transflective type polarizing plate is combined with above described retardation plate respectively.

Although a laminating of the above described hard coat film to the optical element may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

At least one layer of the polarizing plate mentioned above and the optical film element is laminated with the hard coat film. And on the other layer not prepared the hard coat film, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to the optical element or the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical element of the present invention may be preferably used for manufacturing various equipments, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

The above-mentioned is a part of the mode of the embodiments of present invention. According to circumstances, even if the leveling agent etc. is given, the effect of present invention is made the best use of without the adverse effect as for this invention. Moreover, a similar technology is the applied one of a wider usage. For instance, it is not the one that is not only one side of a coated sheet but also processing on both sides is also possible, and limited to the above-mentioned.

The following will describe Examples and so on, through which the structure and advantageous effects of the present invention are specifically illustrated. Of course, the present invention is not limited to these Examples and evaluating methods.

(1) Examples of Coated Sheet

A gravure coater was used to apply a toluene-solvent-based acrylic urethane coating solution having a viscosity of 5 mPa·s and a solid content of 30% by weight onto a 75 μm PET film so as to have a wet thickness of 12 μm. Thereafter, the following steps were performed. The viscosity was based on values measured with a rheometer: RS-1 (manufactured by Heake Co.), and wind speed was based on values measured with a Climomaster: Model 6531 (manufactured by KANOMAX Inc.)

Example 1

The following steps were performed: Wind with a temperature of 25±2° C. was blown from an air blowing nozzle, set at an angle of 5° to a substrate film, onto the film at a wind speed of 15 m/s and a scattering of ±3 m/s in a width direction of the film for 3 seconds in the state that the coating film immediately after the application had a solid content of 43% by weight and a viscosity of 15 mPa·s. Thereafter, the resultant was sufficiently dried in an oven to form a coating film.

Comparative Example 1

A coating film was formed in the same steps as in Example 1 except that the dry wind was blown in the state that the coating film had a solid content of 58% by weight and a viscosity of 47 mPa·s.

Comparative Example 2

A coating film was formed in the same steps as in Example 1 except that the dry wind was blown in a film width direction scattering distribution state that the wind speed was 25±8 m/min.

Comparative Example 3

A coating film was formed in the same steps as in Example 1 except that dry wind having a temperature of 48±5° C. was blown.

(2) Examples of Liquid Crystal Material

A 1% by weight solution of polyvinyl alcohol (PVA) (trade name: NH-18, manufactured by the Nippon Synthetic Chemical Industry Co., Ltd.) in water was applied onto a triacetylcellulose (TAC) film with a thickness of 50 μm (trade name: T-50SH, manufactured by Fuji Photo Film Co., Ltd.) and then dried to form a 0.01-μm PVA coating film. The film was subjected to rubbing treatment to form an oriented film. The liquid crystal monomer (polymeric rodlike nematic liquid crystal) of the formula (A) (6) illustrated above and the chiral agent of the formula (44) were mixed at a ratio by weight of 8/1, and the mixture was dissolved in toluene to have a concentration of 30% by weight. To the toluene solution was further added a photopolymerization initiator (trade name: Irgarure, manufactured by Ciba Specialty Chemicals Inc.) in a concentration of 3% by weight, thereby preparing a coating solution (viscosity: 4 mPa·s). The coating solution was applied onto the above-mentioned oriented film, and the resultant was dried, oriented and UV-cured by the following method. Optically compensating layers yielded in this way were compared with each other about their external appearances.

Example 2

The following steps were performed: Wind with a temperature of 25±2° C. was blown from an air blowing nozzle, set at an angle of 5° to the substrate film, onto this film at a wind speed of 13 m/s and a scattering of ±3 m/s in the width direction of the film for 5 seconds in the state that the coating film made from the liquid crystal monomer solution had a solid content of 36% by weight and a viscosity of 12 mPa·s. Thereafter, the resultant was subjected to heating treatment at 90° C. for 2 minutes, and irradiated with UV ray at 200 mJ/cm$^2$ to form a coating film.

Comparative Example 4

A coating film was formed in the same steps as in Example 2 except that the dry wind was blown in the state that the coated film had a solid content of 63% by weight and a viscosity of 38 mPa·s.

Comparative Example 5

A coating film was formed in the same steps as in Example 2 except that dry wind having a film width direction scattering distribution in which the wind speed was 23±10 m/min was blown.

Comparative Example 6

A coating film was formed in the same steps as in Example 2 except that dry wind having a temperature of 50±5° C. was blown.

Evaluation Results

Interference unevenness generated by thickness unevenness or unevenness of the state of light leakage from an oblique direction under cross nicols were evaluated by visual observation. Table 1 shows the results.

TABLE 1

| | Visual observation evaluation |
|---|---|
| Example 1 | Good evenness and good external appearance |
| Comparative Example 1 | Generation of large spotted unevenness |
| Comparative Example 2 | Generation of streak-form unevenness in the MD direction |
| Comparative Example 3 | Generation of fine-streak-form, intense unevenness |
| Example 2 | Good evenness |
| Comparative Example 4 | Generation of wave-patterned unevenness in the form of spots |
| Comparative Example 5 | Generation of streak-form unevenness in the MD direction |
| Comparative Example 6 | Generation of streak-form unevenness in the MD direction |

INDUSTRIAL APPLICABILITY

As described above, according to the present invention, in a process for producing a coated sheet comprising the step of applying a coating solution containing a resin material and a solvent onto a substrate film to form a coating layer and the step of drying the applied coating solution, various conditions in the drying step are contrived, whereby an optimal coating layer can be formed. Thus, a homogeneous optically functional layer small in unevenness of in-plane coat thickness can be obtained.

Specifically, dry wind is blown onto the surface of a coating film wherein the solid content and the viscosity of a coating solution are in a specified state along the traveling direction of the film, thereby making it possible to attain an improvement in the thickness precision of the coating film and evenness of its in-plane optically functional property even if the area thereof is large.

When the wind speed of the blown dry wind and a scattering in the wind speed are set into specified ranges, the improvement in the thickness precision of the coating film and the evenness of the optically functional property can be more effectively attained.

When the temperature of the blown dry wind and a scattering in the temperature are set into specified ranges, a more appropriate solvent-evaporating speed can be ensured, whereby the improvement in the thickness precision of the coating film and the evenness of the optically functional property can be even more effectively attained.

When the thickness of the coating layer is restricted besides the above-mentioned blowing conditions of the dry wind, the improvement in the thickness precision of the coating film and the evenness of the optically functional property can be even more effectively attained.

The coated sheet producing process as described above is very useful as an optical material with a large area having good properties in an optically functional layer, optically compensating layer or optically compensating plate required to have precision in coating film thickness and evenness of its in-plane optically functional property, and in an optical device having such an optically functional layer or optically compensating plate.

The present invention is also particularly useful for an optically compensating plate obtained in the case that the above-mentioned optically functional layer is an optically compensating layer or in the case that constituent molecules of this optically compensating layer constitute an oriented cholesteric layer having a cholesteric structure since the precision in the thickness of the coating film is high and the evenness of the in-plane optically functional property is good.

When the thickness of the cholesteric layer is from 0.5 to 10 μm, it is possible to prevent the orientation disturbance of the optically compensating layer, a fall in the transmittance thereof and discoloration thereof and improve the selective reflectivity and the productivity thereof.

In an optically compensating plate wherein constituent molecules of the cholesteric layer constitute a non-liquid-crystal polymer and the non-liquid-crystal polymer is a polymer obtained by polymerizing or crosslinking an oriented liquid crystal monomer having a cholesteric structure, the polymer obtained by the polymerization or crosslinking becomes non-liquid-crystalline; therefore, in the formed cholesteric layer, there is not caused a change between liquid crystal phase, glass phase and crystal phase by temperature-change, the phase-change being peculiar to liquid crystal molecules, and the cholesteric structure is not affected by temperature-change. Thus, the present optically compensating plate is an optically compensating plate which is very good in stability and good in evenness of its in-plane optically functional property.

Alternatively, in an optically compensating plate wherein the constituent molecules of the cholesteric layer constitute a liquid crystal polymer and the liquid crystal polymer is oriented in the state that the polymer has a cholesteric structure, the following advantageous effects can be obtained: even if the constituent molecules constitute the liquid crystal polymer, the incorporation of a cholesteric liquid crystal monomer or a chiral agent into the polymer makes it possible to form a cholesteric layer less affected by temperature-change in the same manner as described above, and further produce an optically compensating plate very good in stability and good in evenness of its in-plane optically functional property.

When at least one polarizing plate is laminated on an optically compensating plate as described above, which is very good in stability, an optical device having an excellent optically functional property can be produced.

The image display wherein these are mounted can be rendered an image display wherein unevenness or strain in images is not generated. Thus, they are particularly effective for image displays.

The invention claimed is:

1. A process for producing a coated sheet, comprising the step of applying a coating solution containing a resin material and a solvent and using a material which makes an optical function onto a substrate film to form a coating layer as an optically functional layer and the step of drying the applied coating solution, wherein dry wind having a wind speed of from 4 to 20 m/sec. and a scattering in the wind speed in the width direction of the film of ±30% or less as well as a temperature of from 20 to 45° C. and a scattering in the temperature in the width direction of the film of ±15% or less dry wind is directly blown along the traveling direction of the film onto the surface of the coating layer wherein the coating solution has a solid content of 55% by weight or less and a viscosity of 20 mPa·s or less.

2. The process for producing a coated sheet according to claim 1, wherein the thickness of the dried coating layer is 30 μm or less.

3. The process for producing a coated sheet according to claim 1, wherein a material which makes an optically compensating function is used as the material which makes the optical function, thereby forming the coating layer as an optically compensating layer.

4. The process for producing a coated sheet according to claim 3, wherein the optically compensating layer forms a cholesteric layer wherein constituent molecules are oriented in the state of a cholesteric structure.

5. The process for producing a coated sheet according to claim 3, wherein as the material which makes the optically compensating function, a liquid crystal monomer is used, and after the drying step the coating layer is subjected to polymerizing treatment or crosslinking treatment, thereby forming a cholesteric layer having constituent elements of a non-liquid-crystal polymer wherein the liquid crystal monomers are polymerized or crosslinked.

6. The process for producing a coated sheet according to claim 3, wherein as the material which makes the optically compensating function, a liquid crystal monomer or a liquid crystal polymer is used, thereby forming a cholesteric layer having constituent elements of an oriented liquid crystal polymer having a cholesteric structure.

7. The process for producing a coated sheet according to claim 3, wherein a thickness of the cholesteric layer ranges from 0.5 to 10 μm.

8. A process for producing a coated sheet, comprising the step of applying a coating solution containing a resin material having an optical function and a solvent onto a substrate film to form a coating layer as an optically functional layer having a solid content of 55% by weight or less and a viscosity of 20 mPa·s or less, wherein dry wind having a wind speed of from 4 to 20 m/sec, and a scattering in the wind speed in the width direction of the film of ±30% or less as well as a temperature of from 20 to 45° C. and a scattering in the temperature in the width direction of the film of ±15% or less the step of directly blowing dry wind along the traveling direction of the substrate film onto the coating layer, and the step of drying the coating layer.

9. The process for producing a coated sheet according to claim 8, wherein the thickness of the dried coating layer is 30 μm or less.

10. The process for producing a coated sheet according to claim 8, wherein a material which makes an optically compensating function is used as the material which makes the optical function, thereby forming the coating layer as an optically compensating layer.

11. The process for producing a coated sheet according to claim 10, wherein the optically compensating layer forms a cholesteric layer wherein constituent molecules are oriented in the state of a cholesteric structure.

12. The process for producing a coated sheet according to claim 11, wherein a thickness of the cholesteric layer ranges from 0.5 to 10 μm.

13. The process for producing a coated sheet according to claim 10, wherein as the material which makes the optically compensating function, a liquid crystal monomer is used, and after the drying step the coating layer is subjected to polymerizing treatment or crosslinking treatment, thereby forming a cholesteric layer having constituent elements of a non-liquid-crystal polymer wherein the liquid crystal monomers are polymerized or crosslinked.

14. The process for producing a coated sheet according to claim 10, wherein as the material which makes the optically compensating function, a liquid crystal monomer or a liquid crystal polymer is used, thereby forming a cholesteric layer having constituent elements of an oriented liquid crystal polymer having a cholesteric structure.

* * * * *